United States Patent [19]
Wakabayashi et al.

[11] Patent Number: 4,857,947
[45] Date of Patent: Aug. 15, 1989

[54] POSITION CONTROLLING DEVICE IN A LENS DRIVING APPARATUS FOR CAMERA

[75] Inventors: Hiroshi Wakabayashi, Yokohama; Kazuyuki Kazami; Toshiyuki Nakamura, both of Tokyo; Hidenori Miyamoto, Ichikawa; Daiki Tsukahara, Kawasaki; Kiyosada Machida, Urawa; Yuji Katano, Kawasaki, all of Japan

[73] Assignee: Nikon Corporation, Tokyo, Japan

[21] Appl. No.: 128,448

[22] Filed: Dec. 3, 1987

[30] Foreign Application Priority Data

| Dec. 8, 1986 | [JP] | Japan | 61-291950 |
| Dec. 12, 1986 | [JP] | Japan | 61-295889 |
| May 14, 1987 | [JP] | Japan | 62-118450 |
| May 18, 1987 | [JP] | Japan | 62-122205 |
| May 18, 1987 | [JP] | Japan | 62-122206 |
| May 22, 1987 | [JP] | Japan | 62-126117 |
| May 22, 1987 | [JP] | Japan | 62-77961 |
| Sep. 3, 1987 | [JP] | Japan | 62-134999 |

[51] Int. Cl.$^4$ ............... G03B 5/00; G03B 3/10
[52] U.S. Cl. ............... 354/195.1; 354/400; 354/195.12
[58] Field of Search ............... 354/400–409, 354/195.1, 195.12; 358/227

[56] References Cited

U.S. PATENT DOCUMENTS

| 3,816,651 | 7/1974 | Gardner | 358/227 |
| 4,238,143 | 12/1980 | Shenk | 352/140 |
| 4,508,443 | 4/1985 | Matsuzaki et al. | 354/402 |
| 4,537,487 | 8/1985 | Taniguchi et al. | 354/400 |
| 4,597,657 | 7/1986 | Wakabayashi | 354/195.12 |
| 4,643,555 | 2/1987 | Wakabayashi | 354/403 |
| 4,669,848 | 6/1987 | Wakabayashi | 354/400 |

Primary Examiner—W. B. Perkey
Attorney, Agent, or Firm—Shapiro and Shapiro

[57] ABSTRACT

A camera is capable of displacing a phototaking optical system in the direction of the optical axis by a drive source such as motor and setting the optical system to a plurality of positions. The camera includes a photo-taking optical system, photographing position setting means producing a command signal, a drive source, position detecting means outputting a position signal corresponding to the position of the photo-taking optical system, discriminating means for discriminating the direction of movement of the phototaking optical system, and control means for stopping the drive source and setting the photo-taking optical system at a position corresponding to the command signal as soon as the position indicated by the position signal coincides with the position indicated by the command signal when the discriminating means is discriminating a predetermined first direction of movement, stopping the drive source at a position beyond the position indicated by the command signal and then driving the drive source so that the photo-taking optical system is moved in the first direction when the disciminating means is discriminating a second direction of movement differing from the first direction of movement, and stopping the drive source and setting the photo-taking optical system at the position corresponding to the command signal as soon as the position indicated by the position signal coincides with the position indicated by the command signal.

6 Claims, 25 Drawing Sheets

INTO WIDE POS

FROM WIDE POS
TO TELE POS

FROM TELE POS
TO WIDE POS

INTO RESET POS

FIG. 16
FROM TELE POS
TO WIDE POS
FIG. 17
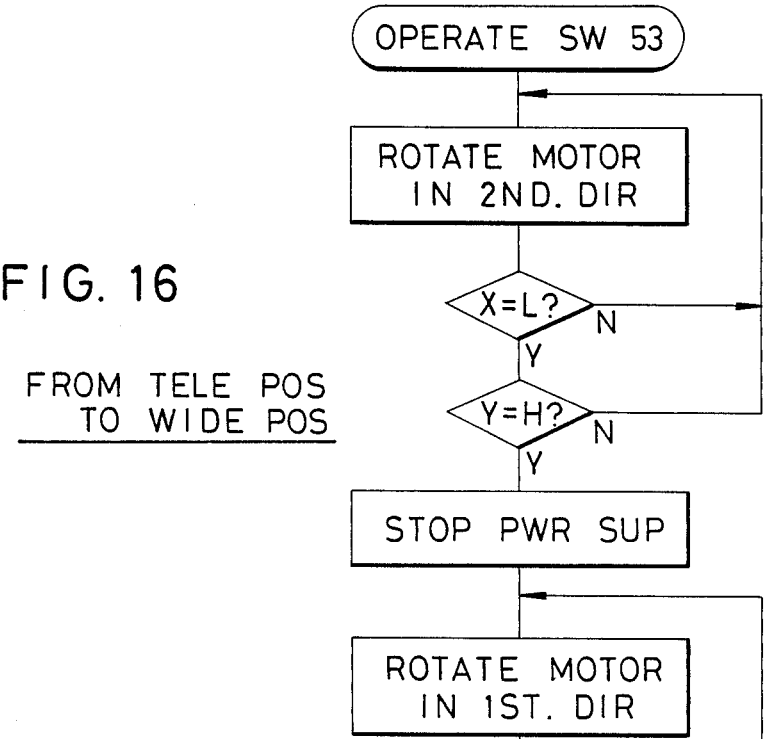
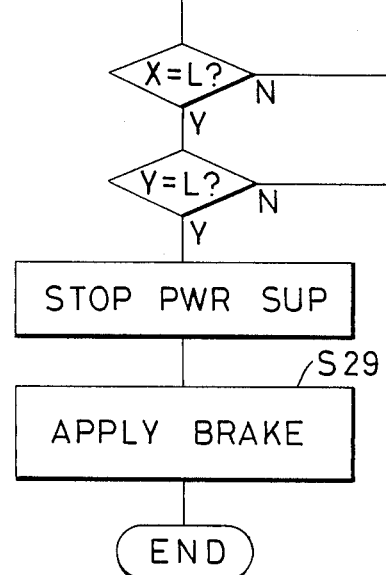
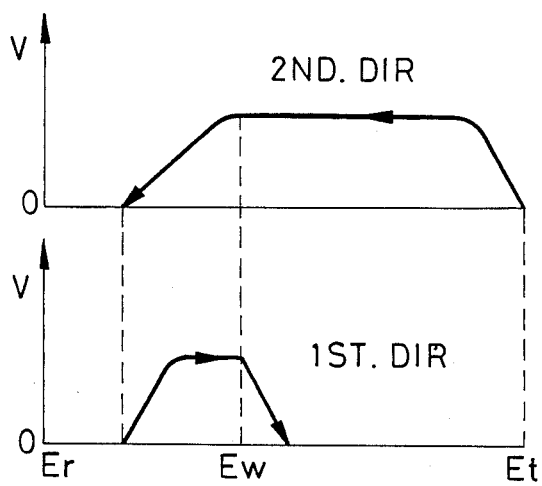

FIG. 18
FROM TELE POS
TO WIDE POS
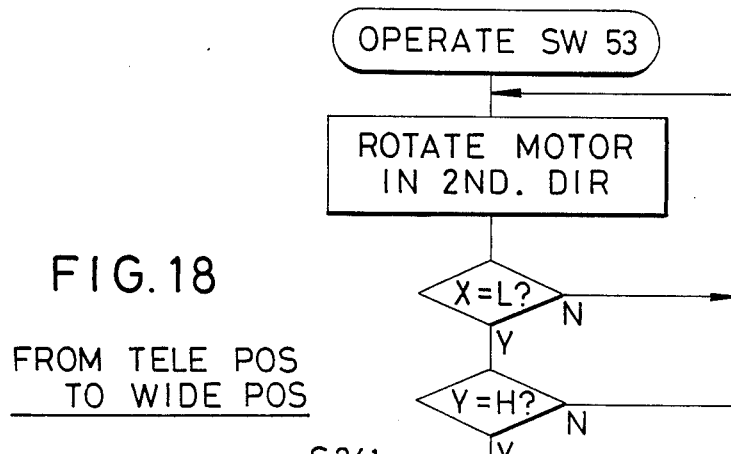
FIG. 19
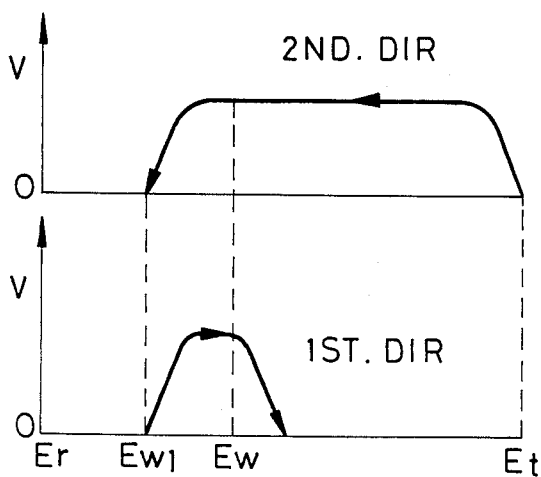
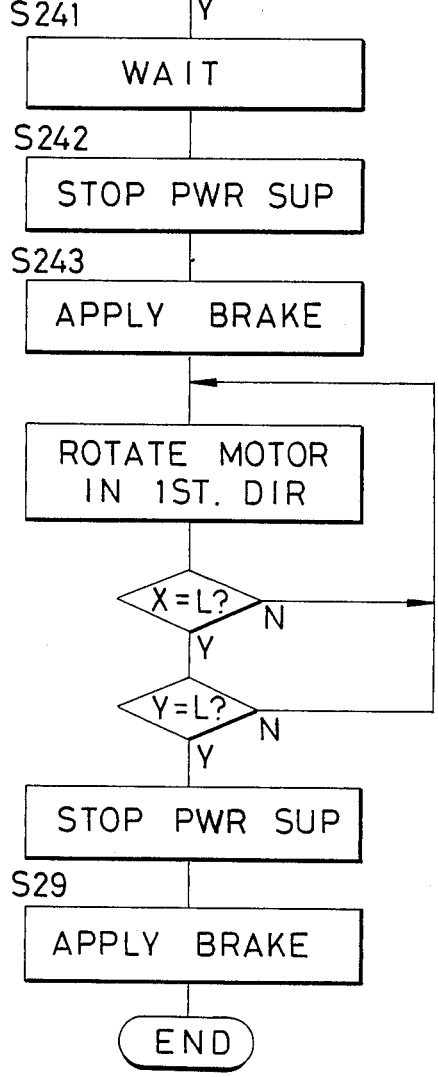

INTO WIDE POS

FROM TELE POS
TO WIDE POS

INTO WIDE POS

FROM WIDE POS TO TELE POS

FROM TELE POS TO WIDE POS

INTO WIDE POS

FROM WIDE POS
TO TELE POS

FROM TELE POS TO WIDE POS

INTO RESET POS

POSITION CONTROLLING DEVICE IN A LENS DRIVING APPARATUS FOR CAMERA

BACKGROUND OF THE INVENTION

1. Field of the Invention

This invention relates to a camera in which a photo-taking optical system is moved in the direction of the optic axis by a drive source such as a motor and the optical system can be set at a plurality of positions.

2. Related Background Art

A camera of this type has, for example, a guide cylinder rotatably supported on the camera body and formed with helicoid in the inner surface thereof, a lens barrel having a helicoid meshing with the helicoid of the guide cylinder formed in the outer surface thereof and having a photo-taking lens disposed therein, a drive motor for rotatively driving the guide cylinder, and an encoder operatively associated with the guide cylinder, and is such that the position of the lens barrel in the direction of the optic axis is known from a position signal from the encoder and the lens barrel is moved to a predetermined photographing position.

Now, the applicant has proposed in U.S. Pat. Nos. 4,597,657, 4,643,555 and 4,669,848 cameras provided with three positions, i.e., the reset position in which the lens barrel has been substantially fully brought into the camera body, the wide angle photographing position in which the lens barrel has been axially moved to the intermediate position in the direction of the optic axis, and the telephoto photographing position in which the lens barrel has been most axially moved. In these cameras, the position of the lens barrel is controlled in the following manner.

A substrate formed with an electrically conductive pattern is secured to the guide cylinder, and for example, three terminals slidable on the electrically conductive pattern are provided on a camera side member fixed to the guide cylinder to constitute an encoder, and a position signal corresponding to the position of the lens barrel is obtained from each terminal of the encoder. The guide cylinder is rotatively driven by the drive motor to axially outwardly or inwardly move the lens barrel through the two helicoids. The position command signal of the lens barrel output from a change-over switch such as a wide angle and telephoto selecting switch and the position signal from the encoder are compared with each other, whereby the position of the lens barrel is known, and the drive motor is stopped at a predetermined position and the lens barrel is directed to the predetermined position.

However, there is always back-lash between the helicoid on the drive side and the helicoid on the driven side. This has led to the problem that a positional error occurs during the axially outward movement of the lens barrel and during the axially inward movement of the lens barrel.

Also, each gear of a gear train forming the transmission route leading from the motor to the guide cylinder is resiliently deformed during the transmission of the drive force for the movement of the lens barrel, and accumulates therein a force of restitution corresponding to the amount of resilient deformation still after the completion of the movement. This force of restitution always acts on the already aligned lens barrel and therefore, there has been the undesirable possibility of the lens position being inadvertently shifted by an extraneous factor such as vibration or the like.

On the other hand, when the lens barrel is to be moved by the motor and stopped at a predetermined target position, for example, the zooming position for obtaining a desired focal length or the in-focus position obtained as a result of focus detection, such speed control that will decrease the movement speed as the lens barrel approaches the target position is preferable from the viewpoints of the saving of the time required for the movement and the accuracy of the stop position. Such control is known, for example, U.S. Pat. No. 4,238,143, etc. This prior art is such that when the photo-taking lens is to be moved in the direction of the optic axis and stopped at a predetermined position, a DC voltage is first supplied to the motor and after the lens has come near the target position, a pulse voltage is supplied to the motor to control the photo-taking lens at a low speed.

However, even in such control, in a camera using a battery as a power source, the power source voltage is reduced with the time of use of the battery and therefore, the rotational speed of the motor also fluctuates. Particularly, if the speed during the low speed control in the vicinity of the target position is not constant, the influence of the inertia force will differ, and the amount of movement of the lens taking place from after the power supply to the motor is stopped until the motor is completely stopped will also differ. This has also led to the problem that the accuracy of the stop position is not stable.

SUMMARY OF THE INVENTION

It is a primary object of the present invention to provide a camera in which the accuracy of movement of the photo-taking optical system is improved to thereby provide a stable optical performance.

It is another object of the present invention to provide a position control device for the photo-taking optical system which controls the photo-taking optical system so that the direction of movement of the photo-taking optical system immediately before the stoppage thereof at the target position is always the same, thereby eliminating the error resulting from the back-lash of helicoids.

It is still another object of the present invention to provide a position control device for the photo-taking optical system in which the force of restitution of resilient deformation accumulated in the drive force transmission route is eliminated to thereby prevent the photo-taking optical system from being undesirably moved even if vibration or the like acts on the camera body.

It is yet still another object of the present invention to provide a position control device for the photo-taking optical system in which even if the power source voltage drops, the movement target position is quickly determined and the position accuracy is improved.

BRIEF DESCRIPTION OF THE DRAWINGS

FIGS. 16 and 18 are flow charts showing modifications of the operation of the first embodiment.

FIGS. 17 and 19 are graphs showing the variations in the speed of a motor corresponding to FIGS. 16 and 18, respectively.

DESCRIPTION OF THE PREFERRED EMBODIMENTS

Figure 1:
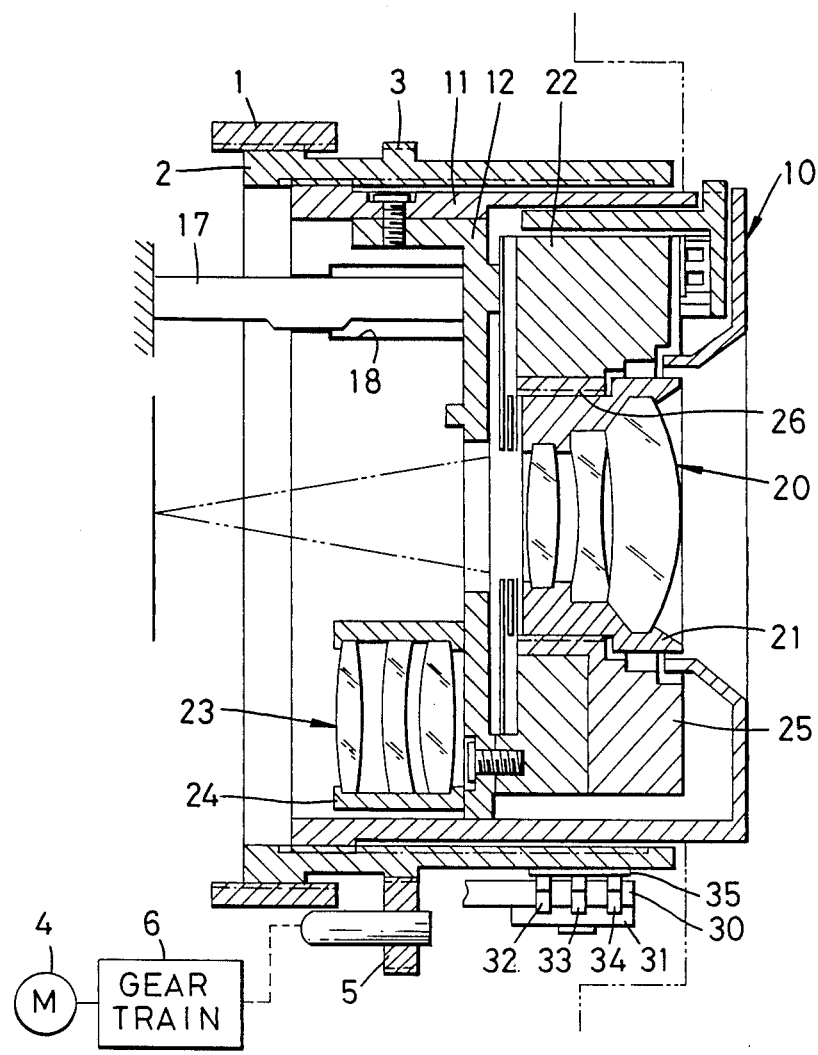
FIGS. 1 and 2 are cross-sectional views of a camera according to a first embodiment of the present invention, FIG. 1 representing the wide angle photographing position, and FIG. 2 representing the telephoto photographing position.
Figure 2:
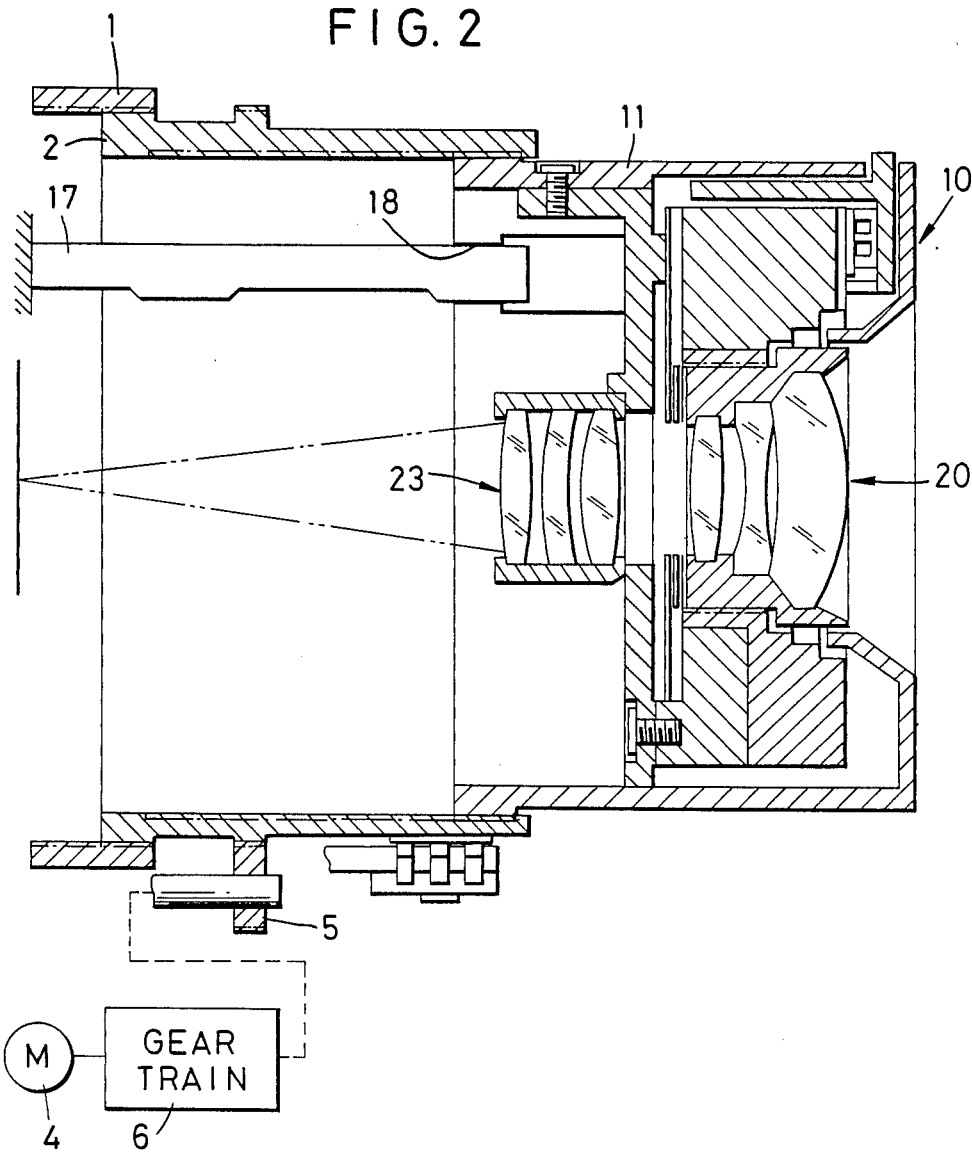

In FIGS. 1 and 2, there are shown cross-sectional views of the lens driving mechanism of a camera according to a first embodiment. FIG. 1 shows the wide angle photographing position (the wide position), and FIG. 2 shows the telephoto photographing position (the tele position).

A fixed barrel 1 is supported on the camera body, and the inner peripheral surface thereof is formed with a helicoid. This helicoid is in meshing engagement with a helicoid on the outer peripheral surface of a drive barrel 2. A gear 3 is formed on the outer peripheral surface of the drive barrel 2, and is in meshing engagement with a drive gear 5 rotatively driven by a motor 4 provided in the camera body through a gear train 6. The gear train 6 comprises gears 61–68 shown in FIG. 3, and the gear 61 is driven by the drive motor 4 and this drive force is transmitted to the drive gear 5 through the gears 62, 63, 64, 65, 66, 67 and 68. Accordingly, the drive force of the gear 5 is transmitted to the gear 3 of the drive barrel 2, so that the drive barrel 2 is axially moved along the photo-taking optic axis through the helicoid between the drive barrel and the fixed barrel 1.

A lens barrel 10 movable back and forth in the direction of the optic axis relative to the drive barrel 2 has an outer cylinder 11 on the outer peripheral surface of which is formed a helicoid meshing with the helicoid formed on the inner peripheral surface of the drive barrel 2. A holding plate 12 is threadably secured to the inner intermediate portion of the outer cylinder 11, and a primary photo-taking optical system 20 held by a holding cylinder 21 is disposed on the right side of the holding plate 12, i.e., on the object side. The holding cylinder 21 is threadably coupled to the inner periphery of the holding cylinder 22 in which a focusing mechanism and a shutter driving mechanism are contained. On the left side as viewed in the Figure, i.e., on the image side, a secondary photo-taking optical system 23 held by a holding member 24 is provided for insertion into and retraction from the optical path. The mechanism for the insertion and retraction of this secondary optical system 23 is well known from the aforementioned U.S. patents.

Figure 4:
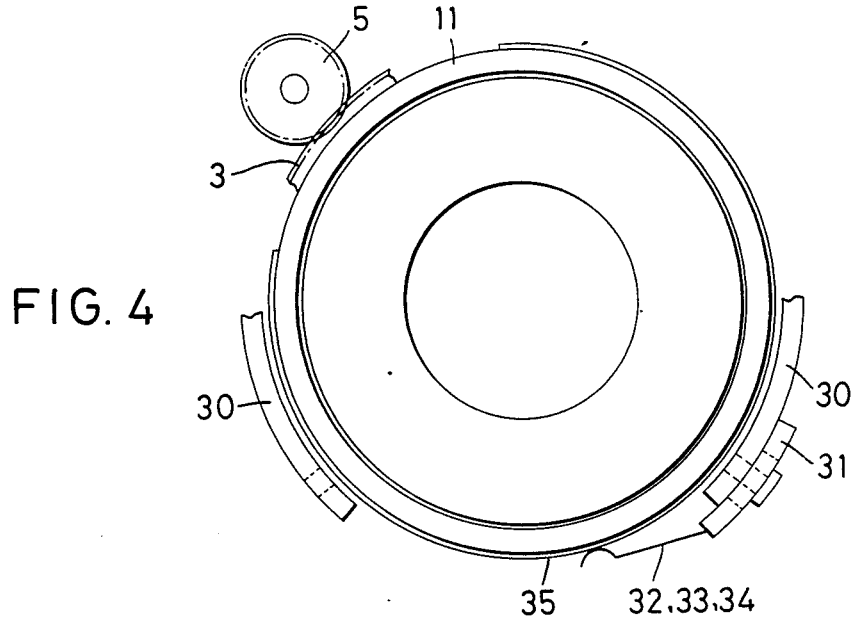
FIG. 4 is a right-hand side view of the camera of FIG. 1.

As shown in FIGS. 1 and 4, a support plate 31 is fixed to a support member 30 secured to the camera body in opposed relationship with the outer peripheral wall of the drive barrel 2, terminals 32, 33 and 34 are supported on the support plate 31, and a circuit substrate 35 adapted to be slidably engaged by these terminals is fixed to the peripheral wall of the drive barrel 2.

Figure 5:
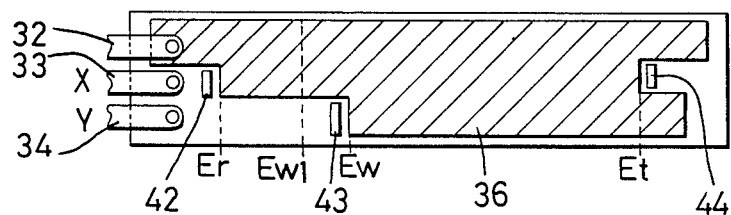
FIG. 5 is a plan view of an encoder.
Figure 6:
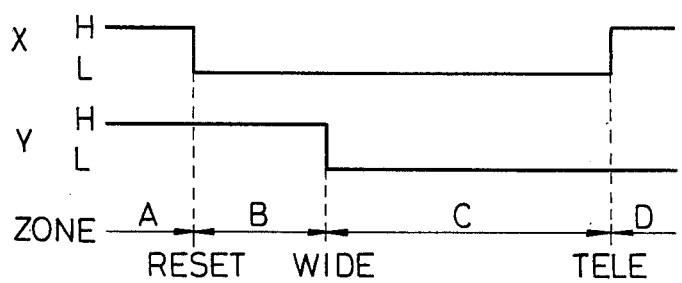
FIG. 6 is a chart showing the output characteristic of the encoder.

The circuit substrate 35 is constructed of a flexible printed substrate and has an electrically conductive pattern 36 shown in FIG. 5. The electrically conductive pattern 36 is a grounded pattern normally slidably engaged by the common terminal 32. In the area A left of the reset position Er, only the common terminal 32 is in contact with the electrically conductive pattern 36, and as shown in FIG. 6, high level (hereinafter referred to as "H") signals are obtained from an X terminal 33 and a Y terminal 34. In the zone B between the wide position Ew and the reset position Er, the common terminal 32 and the X terminal 33 are in contact with the electrically conductive pattern 36, and "L" and "H" signals are obtained from the X terminal 33 and the Y terminal 34, respectively. In the zone C between the tele position Et and the wide position Ew, all terminals 32, 33 and 34 are in contact with the electrically conductive pattern 36 and therefore, "L" signals are obtained from the X terminal 33 and the Y terminal 34. Also, in the zone D right of the tele position Et, the common terminal 32 and the Y terminal 34 are in contact with the electrically conductive pattern 36 and therefore, "H" and "L" signals are obtained from the X terminal 33 and the Y terminal 34, respectively.

Also, auxiliary patterns 42–44 are provided before transition from the zone A to the zone B, before transition from the zone B to the zone C, and before transition from the zone D to the zone C, respectively. These auxiliary patterns are electrically meaningless patterns, but bring about the effect of making the positions of contact with the X and Y terminals 33 and 34 constant.

A key 17 extending long in the direction of the optic axis is provided on the fixed portion of the camera body, and a key way 18 engaged by the key 17 is formed in the inner peripheral surface of the outer cylinder 11.

The state of engagement between the key 17 and the key way 18 will now be described with reference to FIG. 7.

The key 17 is formed with protrusions 171 and 172 so that the key 17 and the key way 18 are engaged with each other without any gap therebetween when the outer cylinder 11, together with the holding plate 12 and the optical system 20, is in the wide position (W) or the tele position (T). The key 17 is formed so that the key 17 and the key way 18 are engaged with each other with a gap therebetween when the outer cylinder 11 is in the other position than the wide position (W) or the tele position (T), i.e., in the reset position (R) or the movement area between the wide position (W) and the tele position (T).

Figure 8:
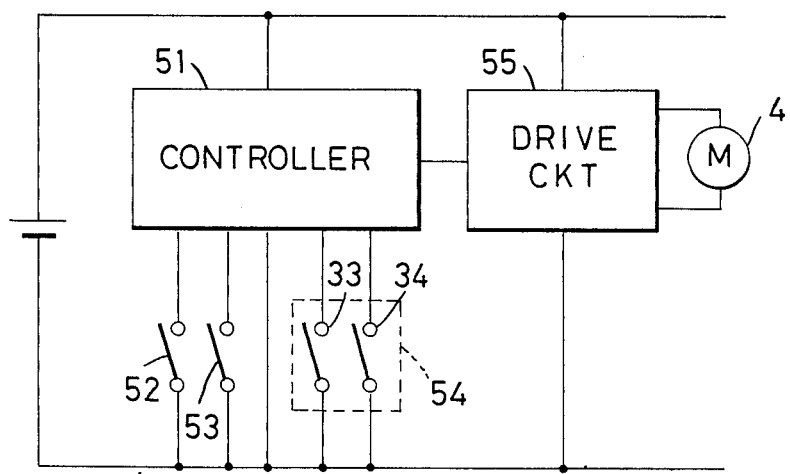
FIG. 8 is a schematic circuit diagram of the control system of a motor.

The control system of this embodiment will now be described with reference to FIG. 8.

The reference numeral 51 designates a controller having a well known microcomputer comprising RAM, ROM, CPU, etc. The reference numeral 52 denotes a main switch, and the reference numeral 53 designates a change-over switch (a TW switch) operated to selectively set the lens barrel at one of the wide position and the tele position. The change-over switch 53 inputs to the controller 51 a position signal conforming to each position. These switches are provided in the camera body. The reference numeral 54 denotes the aforementioned encoder, and signals are input from the X terminal 33 and the Y terminal 34 to the controller 51. The motor 4 rotates the drive gear 5 to rotate the drive barrel 2, thereby directing the lens barrel 10 to a predetermined position, and is drivingly controlled by a drive signal output from a drive circuit 55 on the basis of the processing procedure which will be described later.

As will be described later, the drive circuit 55 supplies a DC drive signal to the motor until the photo-taking lens arrives at the vicinity of its stop position, and supplies a pulse drive signal to the motor when the photo-taking lens arrives at the vicinity of its stop position.

The processing procedure of the lens barrel driving will now be described with reference to FIGS. 9-12.

Figure 9:
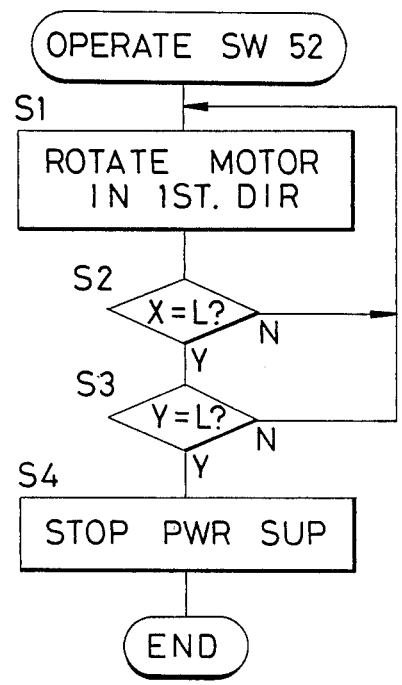
FIGS. 9 to 12 are flow charts showing the operation in the first embodiment.

When the main switch 52 is closed, the motor 4 is driven in accordance with the program of FIG. 9 and the outer cylinder 11 is moved in the direction of the optic axis through the drive barrel 2 and the helicoid coupling, whereby the lens barrel 10 is axially moved to the wide position. That is, at step S1, the motor 4 is revolved in a forward direction (revolved in a first direction), and at step S2, the output X of the terminal 33 is judged as "L", and at step S3, the output Y of the terminal 34 is judged as "L", whereupon at step S4, the power supply to the motor 4 is stopped.

Thereby the wide angle state shown in FIG. 1 is obtained. If in this state, the photographing operation is started, the distance to an object is detected by an automatic distance measuring device, not shown, and the cylindrical portion 26 of a moving device 25 for the primary optical system is rotatively controlled on the basis of the detection signal. In conformity with the rotation of the cylindrical portion 26, the primary optical system 20 is axially moved from the initial position of the wide angle state with the holding cylinder 21, whereby automatic focus adjustment is accomplished.

When the photographing is completed, the primary optical system is returned to its initial position.

Figure 10:
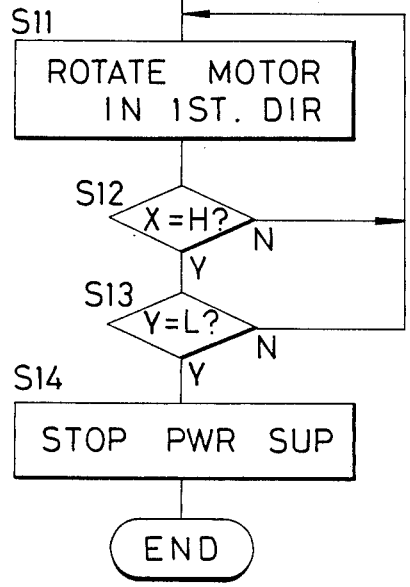

When the change-over switch 53 is operated to select the telephoto photography, the motor 4 is driven in the forward direction in accordance with the program of FIG. 10 and therefore, the drive barrel 2 is rotated. The holding plate 12 has its rotation prevented by the engagement between the key 17 and the key way 18 and is therefore axially moved along the optic axis in accordance with the lead of the helicoid. At step S12, the output X is judged as "H" and at step S13, the output Y is judged as "L", whereupon the power supply to the motor is stopped and the state of FIG. 2 is brought about. In response to the then movement of the holding plate 12, the secondary optical system 23 is inserted onto the photo-taking optic axis and a relatively long focal length by the primary optical system and the secondary optical system is obtained. Again in this case, focus adjustment is automatically accomplished by the rotation of the cylindrical portion 26 of the moving device 25.

Figure 7:
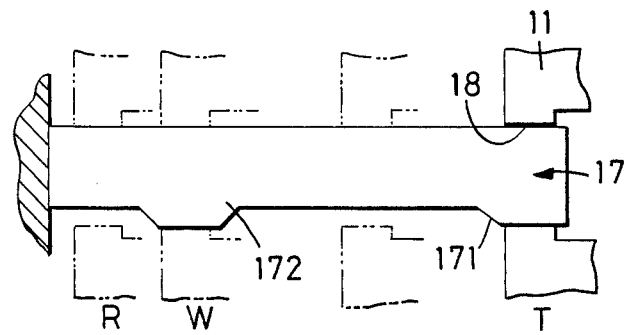
FIG. 7 is a schematic view of the key and key way of the camera of FIG. 1.

When as shown in FIG. 7, the outer cylinder 11 is in the wide position W or the tele position T, the key 17 and the key way 18 are engaged with each other without any gap therebetween, and when the outer cylinder 11 is in the other position than the wide position or the tele position, i.e., in the reset position R or in the movement area between the position W and the position T, a gap is formed between the key 17 and the key way 18. Accordingly, the positioning accuracy in the wide position or the tele position is improved, and in the movement area, the load resulting from friction or the like is mitigated. Thus, the drive efficiency increases and therefore, it becomes possible to accurately move the primary optical system to a predetermined position without reducing the drive speed. In the reset position, photographing is not effected and especially accurate positioning need not be done. Also, conversely to the present embodiment, the key may be provided on the outer cylinder 11 and the key way may be formed in the camera body.

Figure 11:
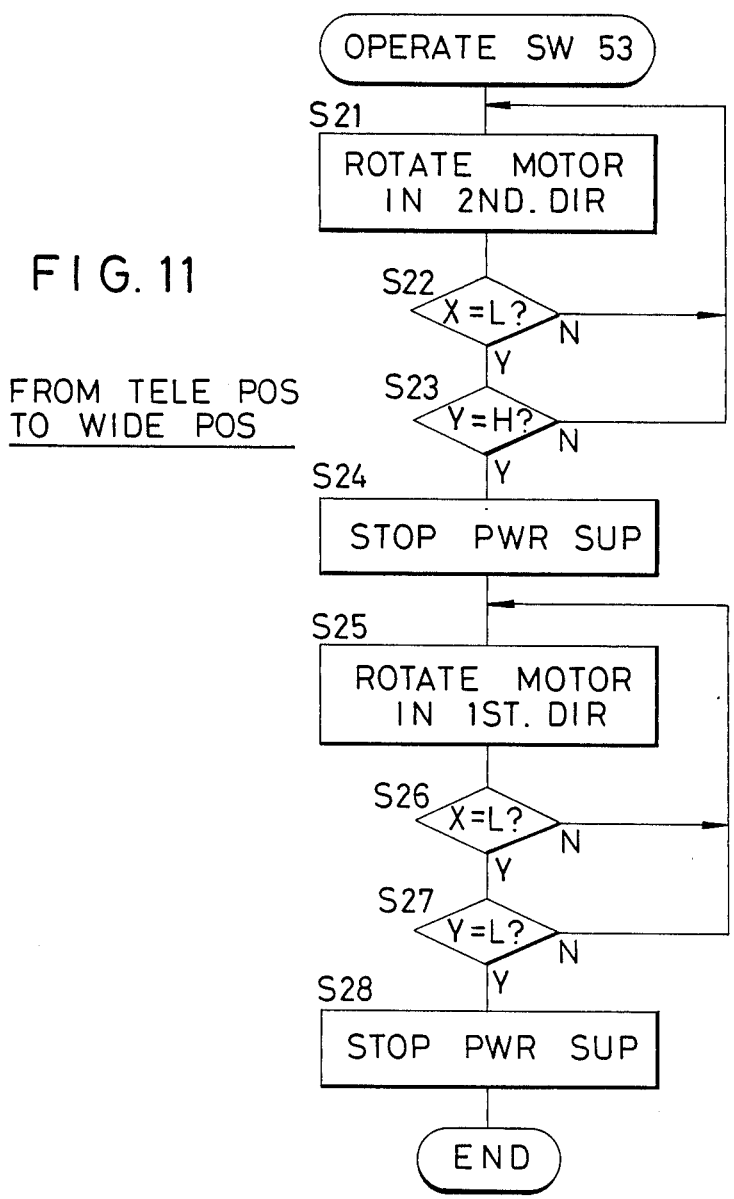

When change-over is made from the telephoto photography to the wide angle photography by the change-over switch 53, the lens barrel 10 is axially moved from the tele position to the wide position by the program of FIG. 11. At step S21, the motor is driven in a reverse direction (rotated in a second direction). At step S22, the output X is judged as "L" and at step S23, the output Y is judged as "H", whereupon at step S24, the power supply to the motor is stopped. Then at step S25, the motor is driven in the forward direction. At step S26, the output X is judged as "L" and at step S27, the output Y is judged as "L", whereupon the power supply to the motor is stopped.

Figure 12:
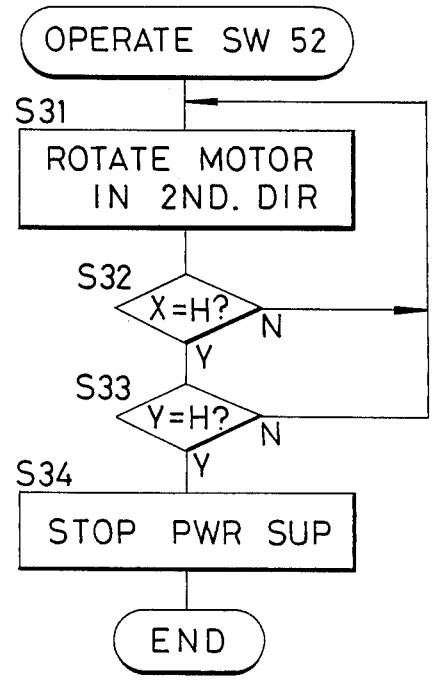

When the main switch 52 is opened, the lens barrel 10 is moved to the reset position, i.e., a position in which it has been substantially completely moved into the camera body, by the program of FIG. 12. At step S31, the motor is reversed, and at step S32, the output X is judged as "H" and at step S33, the output Y is judged as "H", whereupon at step S34, the power supply to the motor is stopped. Thereby, the lens barrel 10 is set at a position in which it has shifted from the zone B of FIG. 6 to the zone A, in other words, the reset position.

As is apparent from the above-described processing procedure, in any of the movement of the lens from the reset position to the wide position, the movement of the lens from the wide position to the tele position and the movement of the lens from the tele position to the wide position, control is made such that the direction of rotation of the motor immediately before the lens barrel is stopped at a desired position is the first direction. It is for the purpose of obtaining the above-described control that particularly as shown in FIG. 11, steps 25–27 are provided when the lens barrel is to be returned from the tele position to the wide position. The reason why such control is effected is as follows.

Figure 13A:
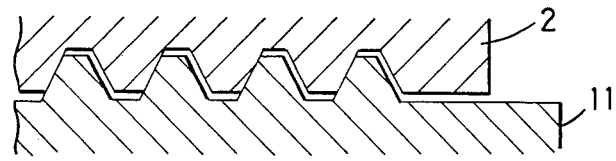
FIGS. 13A and 13B are enlarged cross-sectional views of a helicoid.
Figure 13B:
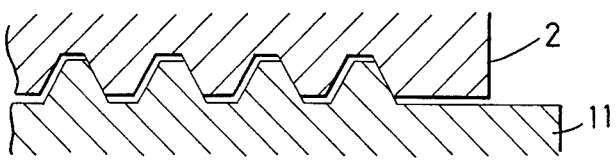

As shown in FIGS. 13A and 13B, there is always back-lash between the helicoid of the drive barrel 2 and the helicoid of the outer cylinder 11. The back-lash as shown in FIG. 13A occurs when the rotation of the drive barrel 2 based on the rotation of the motor in the first direction is transmitted to the outer cylinder 11, and the back-lash as shown in FIG. 13B occurs when the rotation of the drive barrel 2 based on the rotation of the motor in the second direction is transmitted to the outer cylinder 11. This leads to the following problem.

Figure 14:
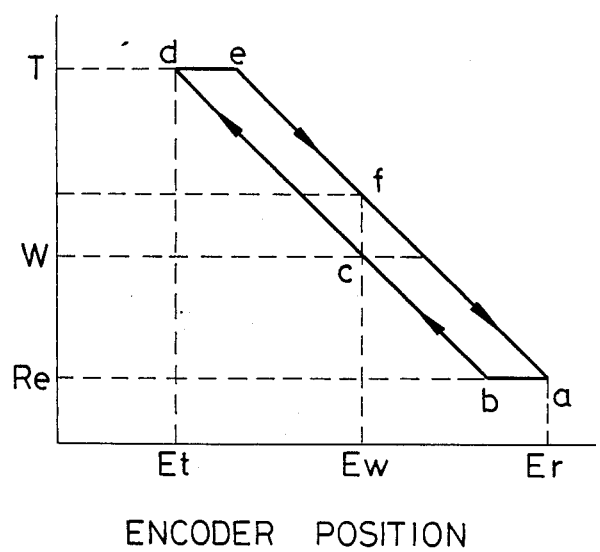
FIGS. 14 and 15 are graphs showing the positional relations between the encoder and the lens.

In FIG. 14, the abscissa represents the positions of terminals in the encoder. Et indicates the tele position, Ew indicates the wide position and Er indicates the reset position. The ordinate represents the positions of the lens barrel. Re indicates the reset position, W indicates the wide position and T indicates the tele position. In the graph, the suffixes 1–4 indicates the case where the lens barrel is axially moved from the reset position to the tele position, and the suffixes 5–8 indicate the case where the lens barrel is axially moved from the tele position to the reset position. During the axial movement from the reset position, the graph is traced in the order of a-b-c-d. At a point of time c whereat the encoder has arrived at the wide position Ew, the lens barrel also arrives at the wide position W. However, when the lens barrel is axially moved from the tele position to the wide position, the graph is traced in the order of d-e-f under the influence of the converse back-lash. Consequently, at a point of time f whereat the encoder has arrived at the wide position Ew, the lens barrel does not yet arrive at the wide position W. As a result, when the motor is stopped by the signal of the encoder, the distance from the film surface to the phototaking optical system deviates and thus, the proper object image is not formed on the film surface.

Figure 15:
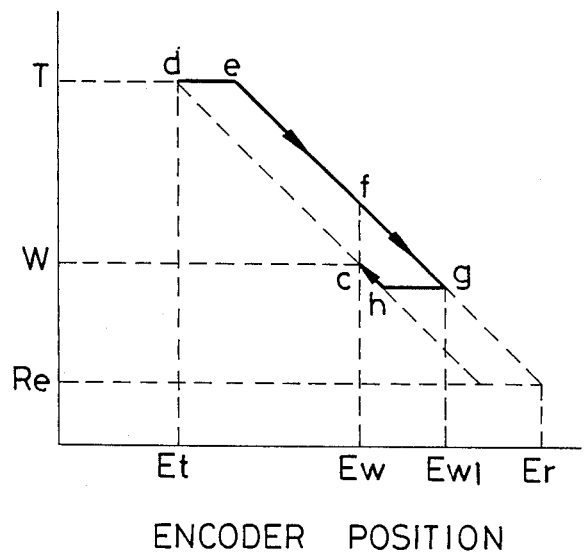

According to the processing procedure of the present embodiment, the positioning error as described above does not occur. That is, as shown in FIG. 15, the lens barrel at the tele position is axially moved by reverse rotation of the motor, and is moved from a point of time d via a point of time e to a point of time g (the encoder is at a position $Ew_1$ (see FIG. 5)). Thereafter, the motor is rotated in the forward direction and back-lash is absorbed between a position g to a position h (within the range of the positions $Ew_1$ and Ew of the encoder), and if the motor is stopped when the lens barrel 10 is further moved axially and the encoder is positioned at Ew, the lens barrel 10 is stopped at the point of time c and moved to the correct wide position.

Several modifications of the processing procedure of the present embodiment will hereinafter be described. The program of FIG. 16, except the last step 29, is the same as the steps S21–S28 shown in FIG. 11. At step S26, it is judged that X=L and at step S27, it is judged that Y=L, whereupon at step S28, the power supply to the motor is stopped and at step S29, the brake is applied and specifically, the power supply circuit of the motor is short-circuited or the power is reversely supplied to the motor and the lens barrel 10 is stopped at the wide position.

FIG. 17 shows the motor drive characteristic by the procedure of FIG. 16. In FIG. 17, the abscissa represents the position of the encoder and the ordinate represents the speed of the motor. When the encoder is moved from the position Et toward the position Ew by the rotation of the motor in the reverse direction and detects the position Ew (step S23), the power supply to the motor is stopped and the motor is driven in the forward direction (step S25). In this case, the motor begins its forward rotation after it has overrun from the position Ew toward the position Er due to the inertia of the load. When the position Ew is again detected, the power supply to the motor is stopped and immediately, braking is effected (step S29). The final stop position of the motor corresponds to the wide position of the lens barrel.

The program of FIG. 18 is one in which steps S241–S243 are provided instead of the step S24 of FIG. 11 and further, step S29 identical to that of FIG. 16 is provided after step S28, and the other steps are the same as the procedure shown in FIG. 11. When the motor is driven in the reverse direction and X=L is judged and Y=H is judged, the timer is started at step S241 and the rotation of the motor in the reverse direction is continued until a predetermined time elapses. When the predetermined time elapses, the power supply to the motor is stopped at step S242 and the brake is applied to the motor at step S243. The motor is then driven in the forward direction and, when it is judged that X=L and it is judged that Y=L, the power supply to the motor is stopped and at step S29, the brake is applied to stop the lens barrel 10 at the wide position.

When in accordance with this procedure, the lens barrel is driven from the tele position to the wide position, there is obtained the drive characteristic as shown in FIG. 19. When during the rotation of the motor in the reverse direction, the encoder detects the position Ew, the timer is started and the rotation of the motor in the reverse direction is continued until a predetermined time elapses. When the predetermined time elapses, the power supply is stopped and at the same time, the brake is applied to the motor and thus, the motor is stopped at the position $Ew_1$. The motor is then driven in the forward direction and, when the encoder detects the position Ew after the constant-speed run of the motor, the power supply is stopped and the motor is immediately braked and thus, the lens barrel is stopped at the wide position.

The modification of FIGS. 20–23 differs only in the shape of the electrically conductive pattern on the printed substrate, the processing procedure when the main switch is in its ON position and the processing procedure of the drive from the tele position to the wide position, and is identical in the other points to the example of FIGS. 9–12. Only the differences will hereinafter be described.

Figure 21:
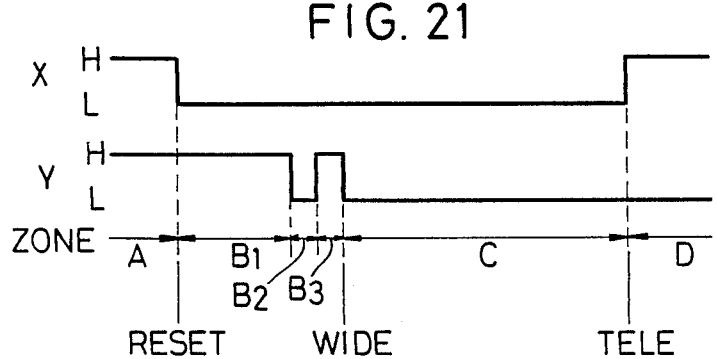
FIG. 21 is a chart showing the output characteristic of the encoder.

In the zone A left of the reset position Er, only the common terminal 32 is in contact with the electrically conductive pattern 45 and as shown in FIG. 21, "H" signals are obtained from the X terminal 33 and the Y terminal 34. The zone between the wide position Ew and the reset position Er is divided into three zones B1, B2 and B3, and in the zone B1, "L" and "H" signals are obtained from the X terminal 33 and the Y terminal 34, respectively. In the zone B2, "L" signals are obtained from the X terminal 33 and the Y terminal 34. In the zone B3, "L" and "H" signals are obtained from the X terminal 32 and the Y terminal 33, respectively. In the zone C between the tele position Et and the wide position Ew, "L" signals are obtained from the X terminal 33 and the Y terminal 34. In the zone D right of the tele position Et, "H" and "L" signals are obtained from the X terminal 33 and the Y terminal 34, respectively.

Figure 22:
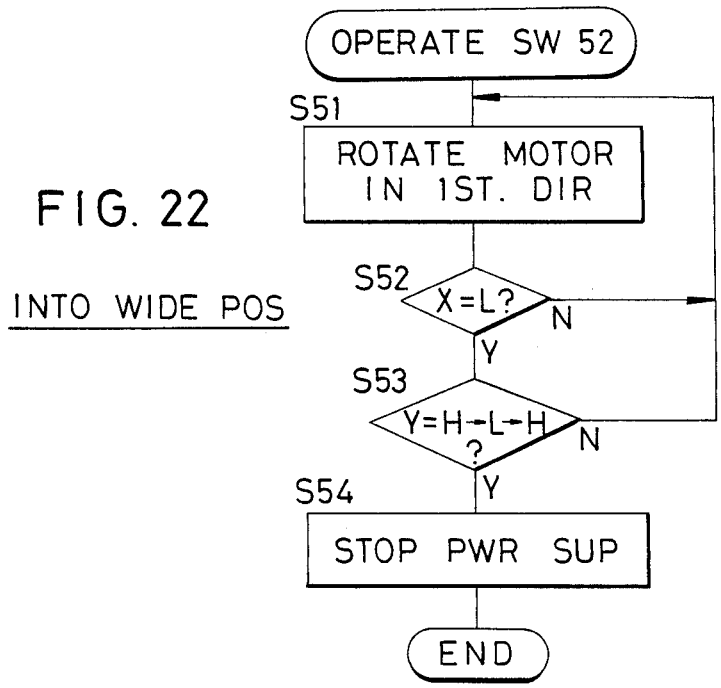
FIGS. 22 and 23 are flow charts showing the control operation in a case where the encoder of FIG. 20 is used.

FIG. 22 shows a program started by the closing of the main switch 52. At step S51, the drive motor is rotated in the forward direction, and at step S52, the output X of the terminal 33 is judged as "L" and at step S53, the output of the terminal 34 is judged as "H"→"L"→"H", whereupon the power supply to the motor is stopped at step S54. Thereby, the lens barrel 10 is placed at a position in which shift has been made from the zone B3 to the zone C, in other words, the wide position.

Figure 23:
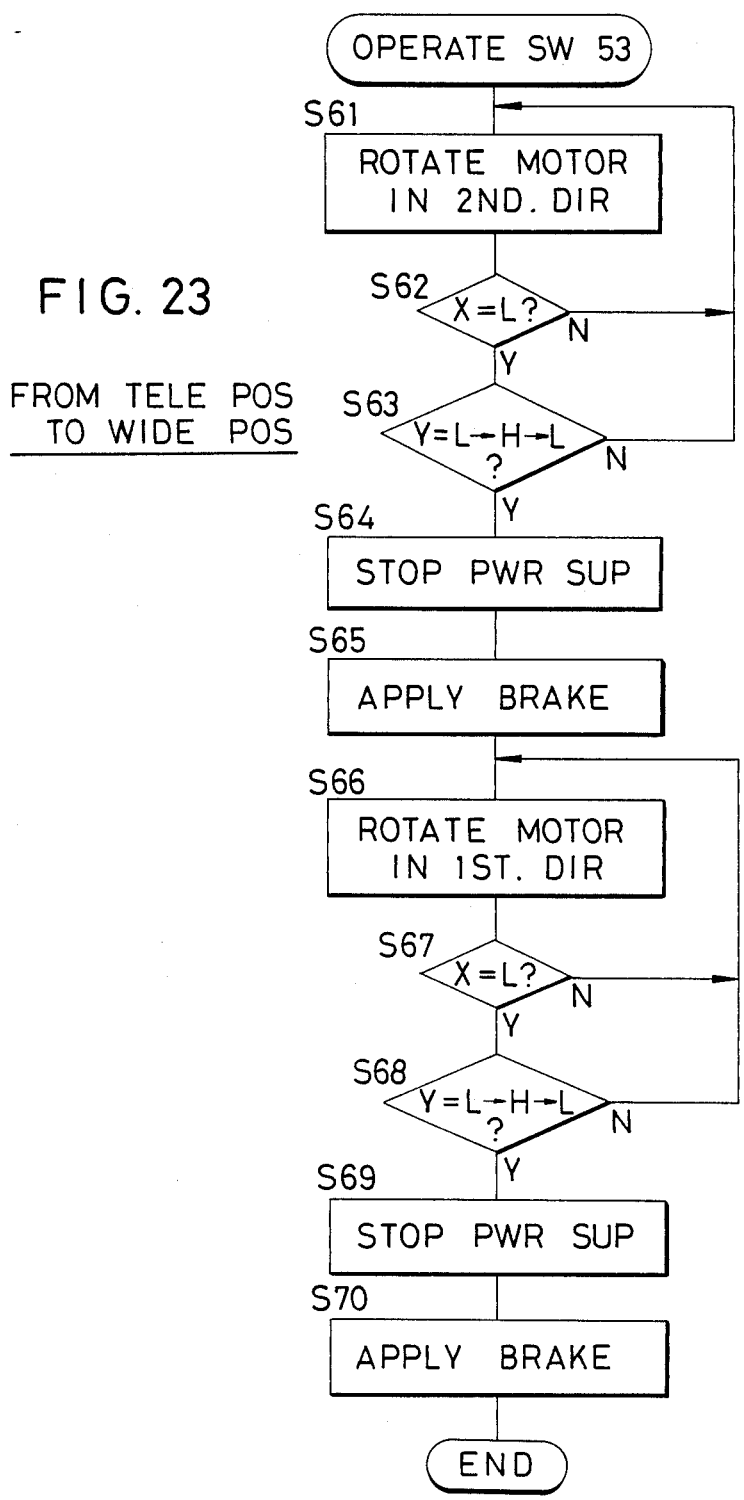

FIG. 23 shows a program which is executed when the setting has been changed from the telephoto photography to the wide angle photography by the change-over switch 53. At step S61, the motor is rotated in the reverse direction. At step S62, the output X is judged as "L" and at step S63, the output Y is judged as "L"→"H"→"H", whereupon the power supply is stopped and at the same time, the motor is braked. At step S66, the motor is rotated in the forward direction. At step S67, the output X is judged as "L" and at step S68, the output Y is judged as "L"→"H"→"L", whereupon the power supply is stopped and at the same time, the motor is braked. By such an operation, the lens barrel 10 placed at the tele position is moved to the wide position.

According to the embodiments of FIGS. 16–19 and FIGS. 20–23, when the lens barrel is to be moved from the tele position to the wide position, the motor is run at a constant speed during its rotation in the forward direction and then it is stopped at the wide position W and therefore, the same motor stop characteristic as that when the lens barrel is moved from the reset position to the wide position can be obtained, and the positional accuracy is further improved.

Figure 3:
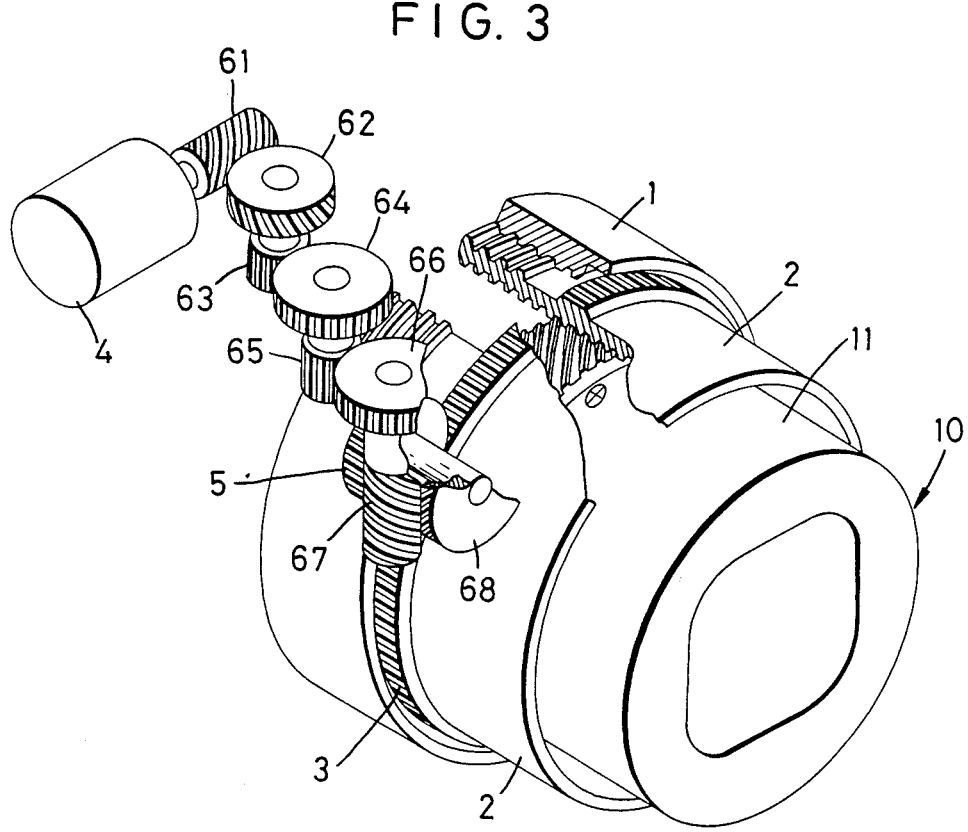
FIG. 3 is a perspective view showing the transmitting mechanism of the camera of FIG. 1.
Figure 24:
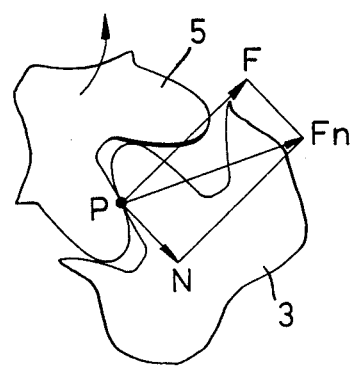
FIGS. 24 and 25 are enlarged views showing the meshing engagement of a gear train.
Figure 25:
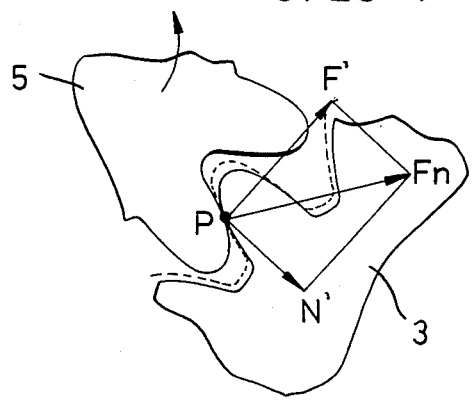
Figure 26:
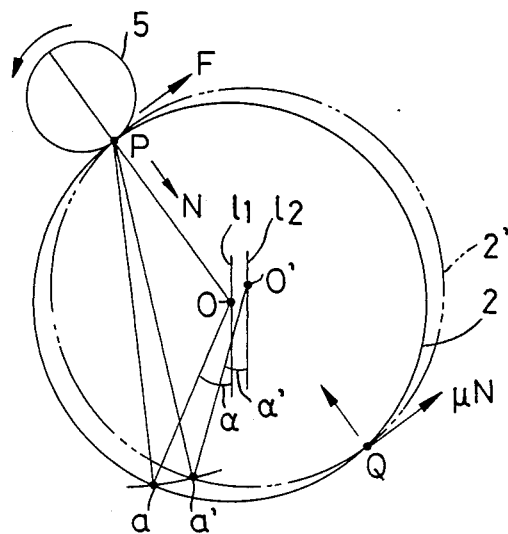
FIGS. 26 and 27 are schematic views showing the positional relations between the barrel and the gear.

In the construction of FIGS. 1–3, in the initial state in which the gear 5 meshes with the gear 3 of the drive barrel 2, the vertical force applied from the gear 5 to the point P of the gear 3 is Fn as shown in FIG. 24, and the components of force thereof are N and F. When the meshing engagement between the two gears progresses, the drive barrel 2 is deformed in a direction away from the gear 5 by the force component N and the inter-axis distance between the gear 5 and the gear 3 increases with a result that as shown in FIG. 25, the force component N increases to N'. If the drive barrel 2 is formed of a thin-walled plastic cylinder or the like, the inter-axis distance is further increased by the deformation of itself and the tendency of the force component N toward the increase becomes remarkable. Also, as shown in FIG. 26, the drive barrel 2 meshes with the fixed barrel 1 at a point Q opposite to the point P and therefore, as the reaction of the force component N, a reaction force N acts on the drive barrel 2 from the fixed barrel 1 through the helicoid.

Now, when the controller 51 produces a command for stopping the motor 4, the motor 4 continues to rotate for a while by the inertia thereof, and the motor 4 stops completely when the inertia torque by the moment of inertia on the output shaft side of the motor becomes equal to the load torque on the drive barrel 2 side. At this time, each gear is resiliently deformed correspondingly to the load torque on the drive barrel 2 side and the load by this resilient deformation force acts on the tooth surface of each gear. The drive barrel 2, as shown in FIG. 26, is subjected to the reaction force N from the fixed barrel 1 at the point Q while being deformed by the vertical force component N at the point P. Therefore, the drive barrel 2 becomes eccentric to a position indicated by an imaginary line due to the horizontal force component F at the point P with the point Q as the center of rotation, and is stopped in a state in which the center of rotation O has moved to O'. Accordingly, the friction force $\mu N$ caused by the vertical reaction force N acts on the point Q and resists the force of restitution of the drive barrel 2'.

When the reaction force N from the fixed barrel 1 is weakened by the extraneous vibration or the like and $\mu N$ becomes small, the drive barrel 2' is rotated to a position indicated by solid line about the point P by the above-described force of restitution acting on the drive barrel 2'. As a result, the center of rotation O' moves to O and an arbitrary point a' moves to a point a. When angle formed between a reference line 11 passing through the center of rotation 0 and a line O-a is o and an angle formed between a reference line 12 passing through the center of rotation O' and parallel to the reference line 11 and a line O'-a' is $\alpha'$, it follows that the drive barrel 2 has been rotated by $\alpha - \alpha' = \Delta\alpha$. In other words, when a vibration or the like is applied to the camera, there is the undesirable possibility that the photo-taking position of the lens barrel deviates by this amount $\Delta\alpha$.

Figures 28, 29:
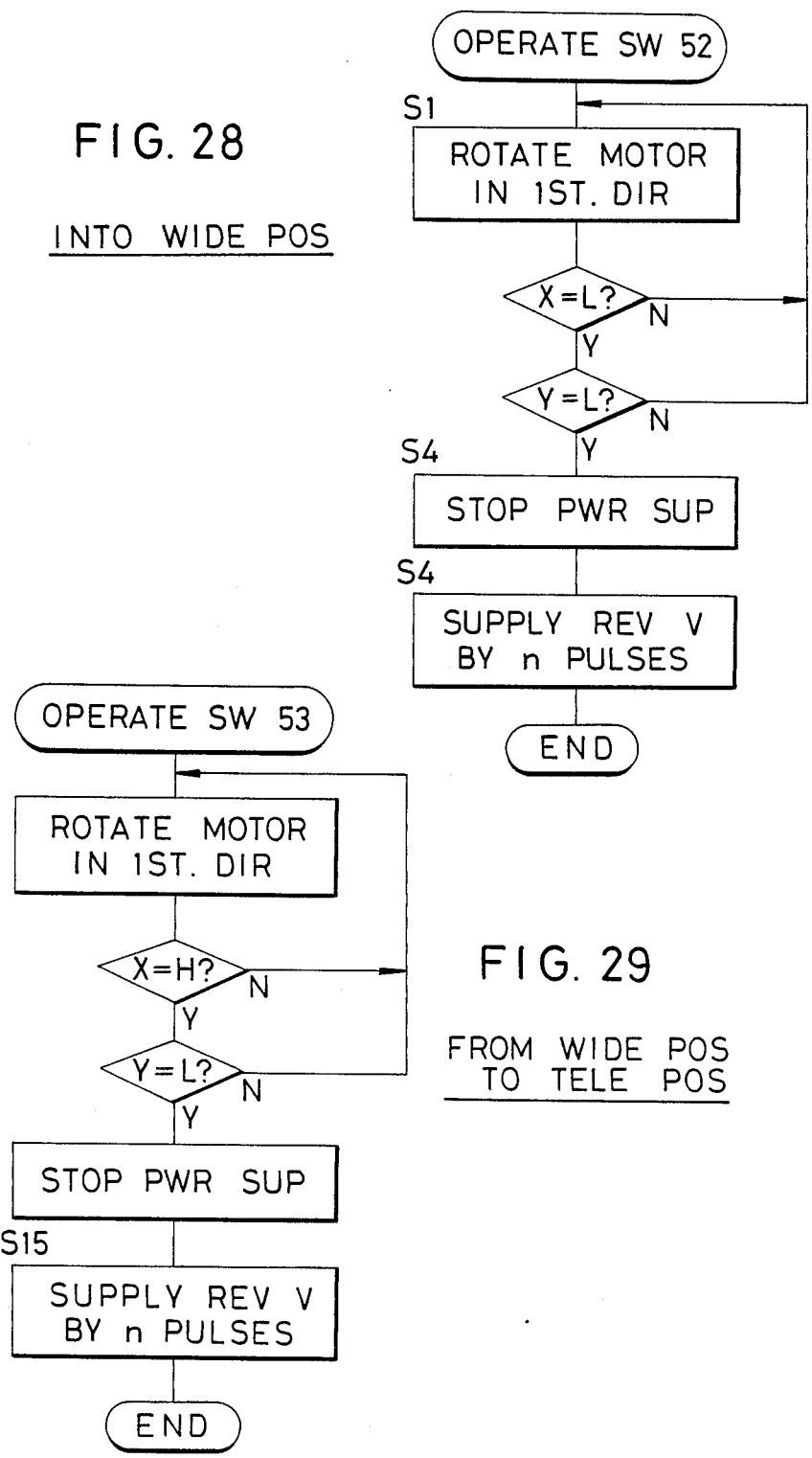
FIGS. 28 to 30 are flow charts showing further modifications of the operation of the first embodiment.
Figure 30:
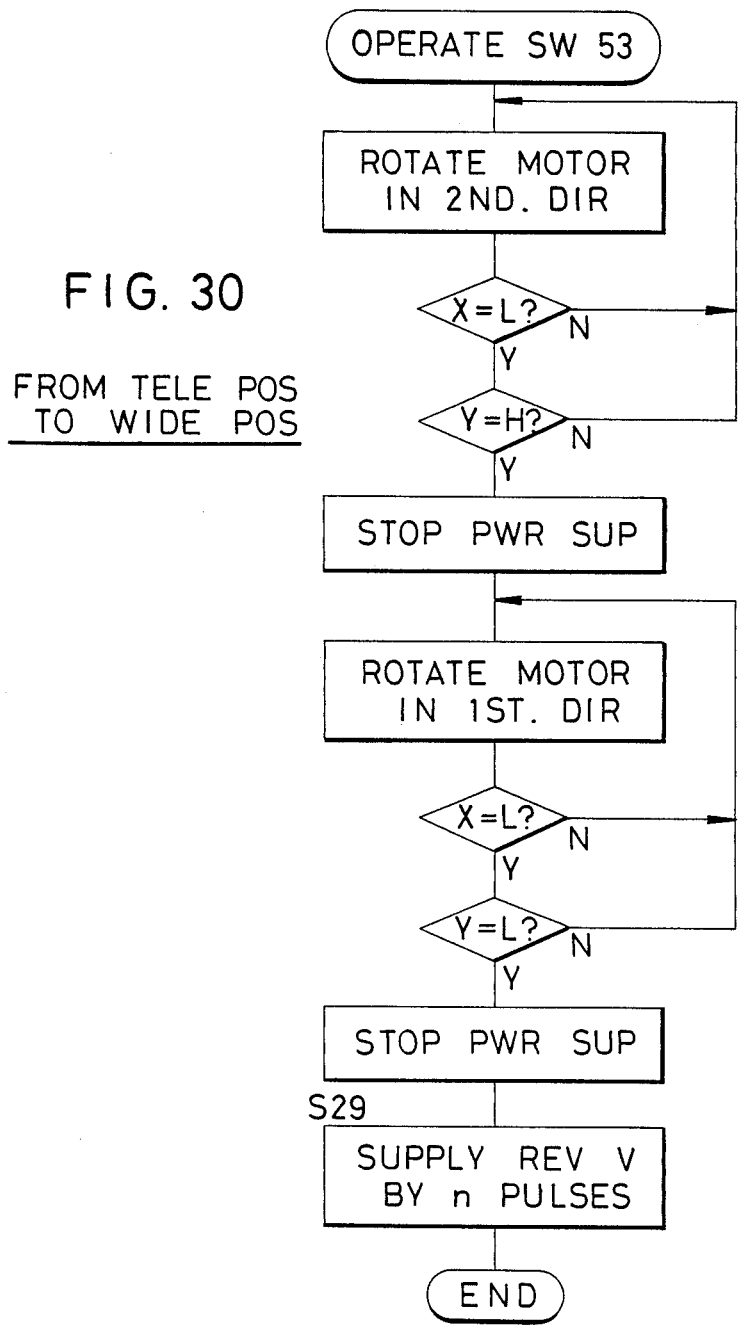

The above-noted problem is solved by controlling the motor in accordance with a program shown in FIGS. 28–30. This program is basically identical to the program of FIGS. 9–11, but is characterized by the provision of steps for reversing the rotation of the motor by a minute amount immediately after the power supply to the motor is stopped.

Figure 27:
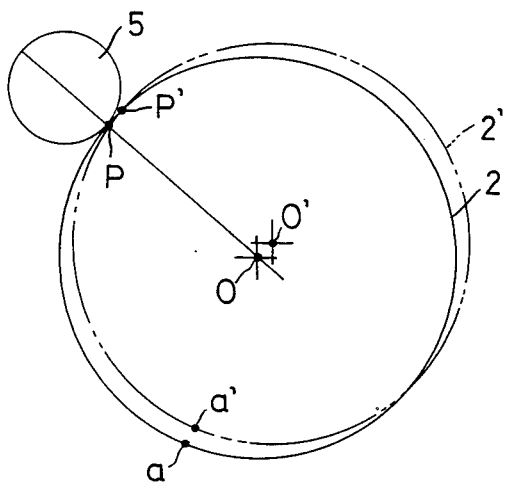

When the rotation of the motor in the forward direction has been completely stopped at the step S4 of FIG. 28, the drive barrel has become rotated about the point Q as indicated by an imaginary line 2' (see FIG. 27). So, when at step S5, the motor is rotated in the reverse direction by a minute amount by a pulse voltage of the opposite polarity being supplied to the motor by an amount corresponding to n pulses and the resilient deformation force of the gear train 6 is eliminated, the load which has so far acted on the point P is eliminated and the vertical force component N thereof disappears and the friction force $\mu N$ at the point Q becomes null. Therefore, the drive barrel is parallel-moved from the state indicated by 2' to the state indicated by 2 and the center of rotation O' returns to O and the point a' returns to the point a. At this time, the drive barrel does not rotate. Accordingly, the resilient deformation of the gear train, etc. is eliminated without the lens barrel being moved. From this fact, the reversely supplied pulse is set to a minimum pulse number necessary to eliminate the resilient deformation of the gear train. Instead of pulse power supply, reverse power supply may be effected for a predetermined time, but pulse power supply is desirable in terms of controllability.

Again in the case of the movement from the wide position to the tele position shown in FIG. 29 and the case of the movement from the tele position to the wide position shown in FIG. 30, steps S15 and S29 are provided, respectively, and a voltage of the opposite polarity is supplied to the motor by n pulses.

Description will now be made of an example of the general procedure of the photographing operation including the position setting of the photo-taking lens and the exposure operation.

Figure 31:
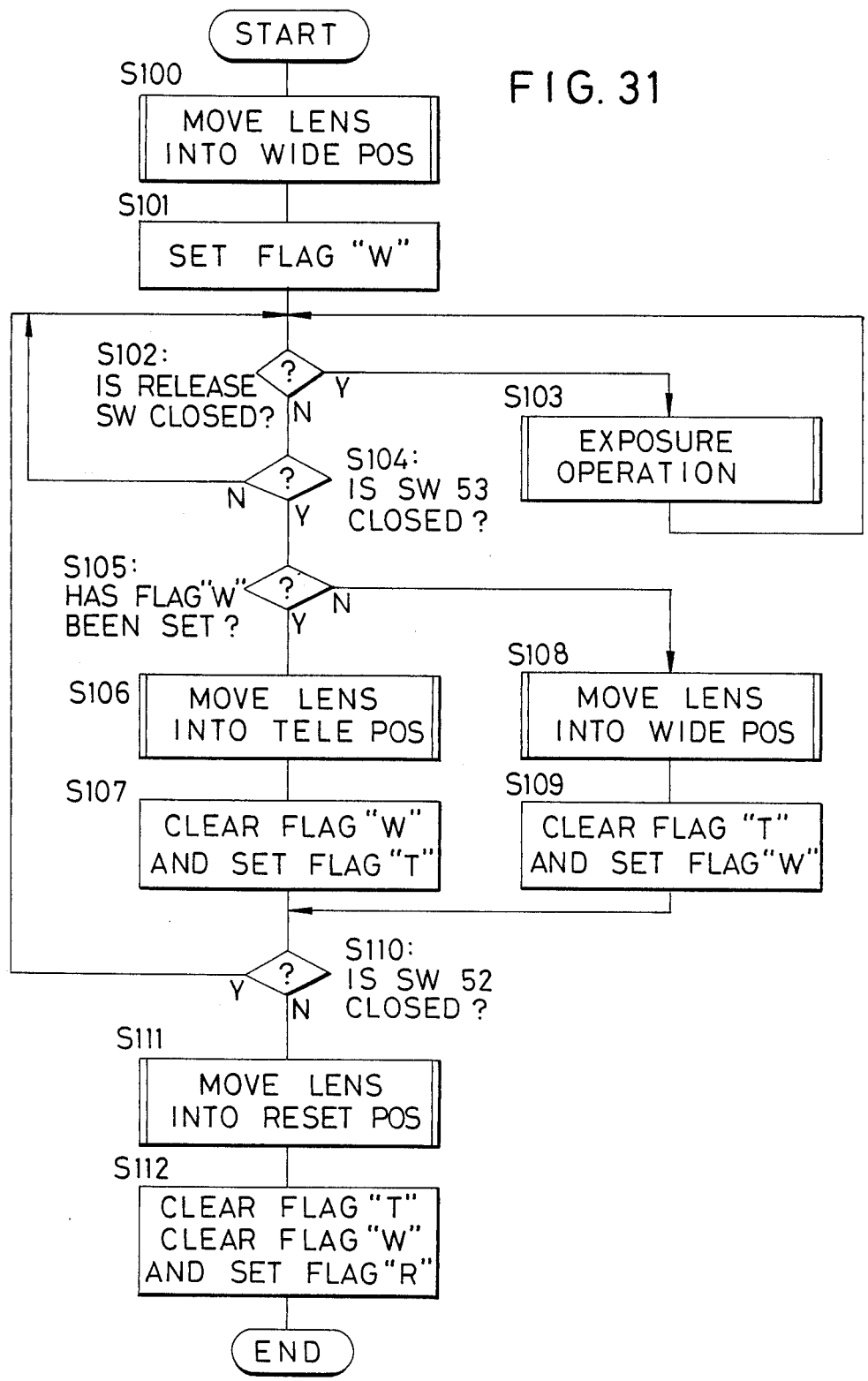
FIG. 31 is a flow chart showing the general operation of photographing

In FIG. 31, when the main switch 52 is closed, step S100 is executed and the lens barrel 10 is axially moved to the wide position, for example, by the program of FIG. 9. Then at step S101, flag W is set.

Thereafter, the program proceeds to step S102, where whether the release switch is closed is determined, and if the answer is affirmative, the well-known exposure operation procedure is executed at step S103, and after the termination of the exposure, the program returns to step S102. In the sub-routine of the exposure operation of step S103, flags W and T are read in to thereby detect the current position of the lens barrel 10. The F-value of the lens differs between the case where the lens barrel 10 is at the wide position and the case where the lens barrel 10 is at the tele position and therefore, a proper exposure value is calculated in conformity with the information of each flag, whereafter controls such as aperture control and shutter time control are effected and the film is exposed. If at step S102, the answer is negative, the program proceeds to step S104, where whether the change-over switch 53 has been closed is determined. If the answer is negative, the program returns to step S102, and if the answer is affirmative, the program proceeds to step S105. At step S105, whether flag W is set is determined, and if the answer is affirmative, the program proceeds to step S106.

That is, when the telephoto photography is selected by the change-over switch 53, the lens barrel 10 is axially moved from the wide position to the tele position, for example, by the program of FIG. 10 Then at step S107, flag W is cancelled and flag T is set.

If at step S105, the answer is negative, the program proceeds to step S108. That is, when change-over is made from the telephoto photography to the wide angle photography by the change-over switch 53, the lens barrel 10 is axially moved from the tele position to the wide position, for example, by the program of FIG. 11. Then at step S109, flag T is cancelled and flag W is set.

Subsequently to step S107 or S109, the program proceeds to step S110. At step S110, whether the main switch 52 is closed is determined, and if the answer is affirmative, the program returns to step S102, and if the answer is negative, the program proceeds to step S111. That is, when the main switch 52 is opened, the lens barrel 10 is moved to the reset position, i.e., the position in which it has been substantially completely brought into the camera body, by the program of FIG. 12. Then at step S112, flags T and W are cancelled and flag R is set.

In the above-described processing procedure, when the photo-taking lens has been moved to the wide position, flag W is set, and when the photo-taking lens has been moved to the tele position, flag T is set, whereby the position of the photo-taking lens is memorized, and on the basis of this memorized position, the direction of drive of the motor is determined in response to the command by the change-over switch 53 (step S105).

The following problem can be solved by such feature.

Figure 20:
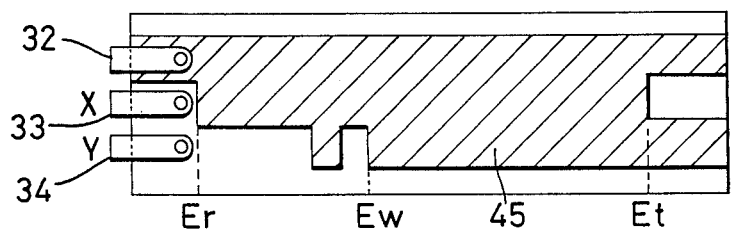
FIG 20 is a plan view showing a modification of the encoder.
Figure 32:
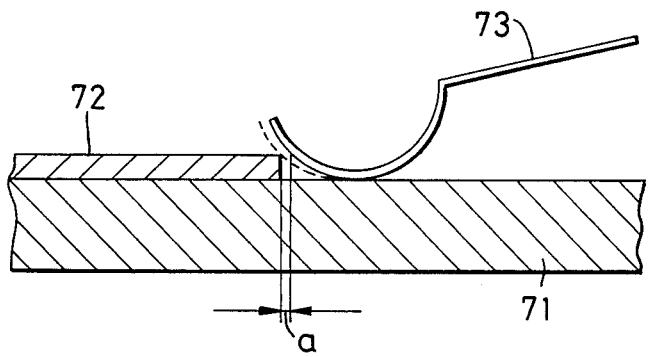
FIG. 32 is an enlarged view of the brush of the encoder.

A brush 73 constituting the X, Y and common terminals of the encoder shown in FIG. 5 or 20 slides on an electrically conductive pattern 72 provided on an insulating substrate 71 as shown, for example, in FIG. 32. When the brush 73 arrives at a position indicated by solid line, the brush separates from the electrically conductive pattern and a position detection signal of high level is output from the brush and the command position is detected.

However, in such a command position, the brush and the electrically conductive pattern are spaced apart from each other with a very small spacing (e.g., dimension a) therebetween and therefore, after the lens barrel has once been set at a predetermined command position, the brush may contact the electrically conductive pattern as indicated by broken line due to the vibration or the like acting on the camera in spite of the lens barrel being in the command position. Therefore, the motor is driven again and the lens barrel is driven again until the brush separates from the electrically conductive pattern. Since such a phenomenon occurs each time vibration is applied to the camera, the lens barrel is undesirably driven each time the phenomenon occurs.

In the program shown in FIG. 31, once the lens barrel has been moved to the command position, the lens barrel is not uselessly driven even if the position signal detected by the encoder changes and therefore, the above-noted problem does not arise.

Figure 33:
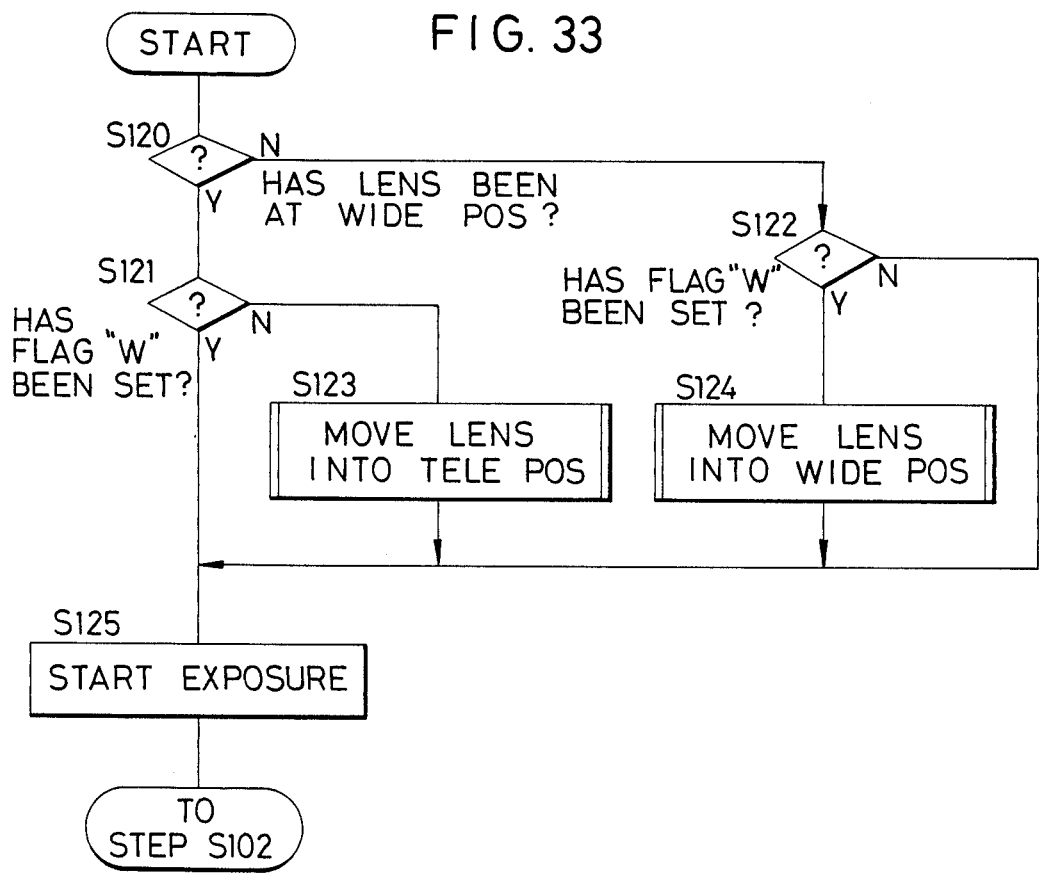
FIG. 33 is a flow chart of the sub-routine of the exposure operation.

The exposure operation sub-routine (step S103) of FIG. 31 may be designed as shown in FIG. 33. That is, prior to the exposure, the current position of the lens barrel is detected by the position signal from the encoder (step S120) and the detected current position and the state of the flag are compared (steps S121 and S122) and if they are incoincident, the lens barrel is driven so that it coincides with the flag (steps S123 and S124), and then at step S125, the exposure is started. Not only when the state of contact between the encoder brush and the electrically conductive pattern is unstable due to vibration, but also when the position itself of the lens barrel has deviated from the command position, according to this procedure, photographing is effected after the lens barrel is correctly set at the command position and therefore, erroneous photographing can be prevented.

A second embodiment of the present invention will now be described.

In this embodiment, design is made such that the motor is driven by a DC voltage until the lens barrel is moved toward a predetermined range including a designated target position and that once the lens barrel has been moved to said predetermined range, the motor is driven by a pulse voltage, and quick and accurate movement of the lens is realized without being affected by the fluctuation of the power source voltage, the aforementioned back-lash of the helicoid and the state of contact of the brush in the encoder.

Figure 34:
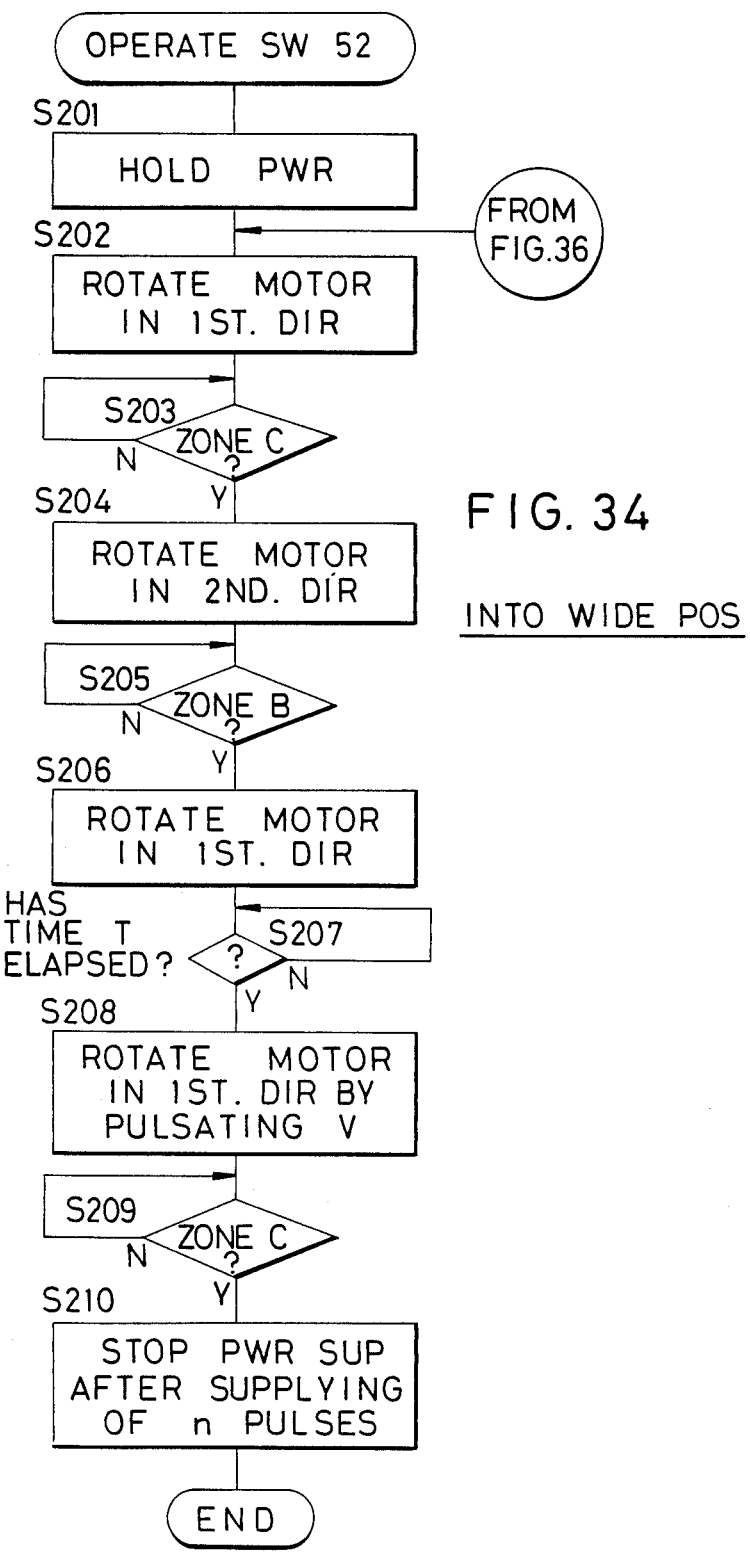
FIGS. 34 to 37 are flow charts showing the operation according to a second embodiment of the present invention.

The construction of the camera used in this embodiment is similar to that shown in FIGS. 1–8. When the main switch 52 is closed, the program of FIG. 34 is started and by steps S201–S210, the lens barrel 10 is axially moved from the reset position to the wide position. That is, at step S201, the power source is held and thereafter, until the hold of the power source is released, the power supply to a motor drive circuit 55 is maintained irrespective of the state of the main switch 52. Then, at step S202, the motor drive circuit 55 supplies a DC drive signal to the motor 4 to rotate the motor in the forward direction, and the rotation of the motor in the forward direction is continued until the zone C of FIG. 6 is detected at step S203, and if the step S203 is affirmed, the motor is reversed in its direction of rotation at step S204. The motor continues the rotation in the reverse direction until the zone B is detected, and if step S205 is affirmed, the motor is again rotated in the forward direction. It step S207, the forward rotation of the motor by full power supply (DC drive signal) is continued for a predetermined time T, whereafter at step S208, the motor drive circuit 55 supplies a pulse drive signal to the motor and pulse-drives the motor. When at step S209, the zone C is detected, power is further supplied to the motor by n pulses, whereafter the power supply to the motor is stopped.

By the above-described processing, the lens barrel is moved from the reset position to the wide position. The then movement of the lens barrel, the signals from the X and Y terminals 33 ad 34 of the encoder and the voltage across the motor will hereinafter be described with reference to FIG. 38.

By the forward rotation of the motor to which a positive voltage has been applied, the lens barrel is moved at a high speed from the reset position toward the wide position, i.e., in a protruding direction. When at time $t_1$, the encoder detects the zone C, a negative voltage is applied to the motor and reverse power supply brake is applied, but the lens barrel is still moved in the same direction by its inertia, and from a certain time onward, it is moved in a retracting direction. When at time $t_2$, the encoder detects the zone B, a positive voltage is applied to the motor for a predetermined time T, and reverse power supply brake is applied. At this time, the lens barrel continues the movement in the retracting direction by its inertia till a certain time. After the lapse of said predetermined time, a positive voltage is pulse-supplied to the motor to thereby rotate the motor in the forward direction at a low speed. The lens barrel is intermittently axially moved while repeating drive and stoppage at each pulse. When at time $t_3$, the encoder detects the zone C, power is further supplied to the motor by n pulses, whereafter the power supply is stopped and the lens barrel is stopped at the wide position. Accordingly, by the supply of n pulses after the detection of the zone C, the lens barrel is further axially moved by $\Delta S$ with a result that the terminals 32-34 of the encoder are stopped at a position entering into the zone C from the boundary between the zone B and the zone C.

Figure 35:
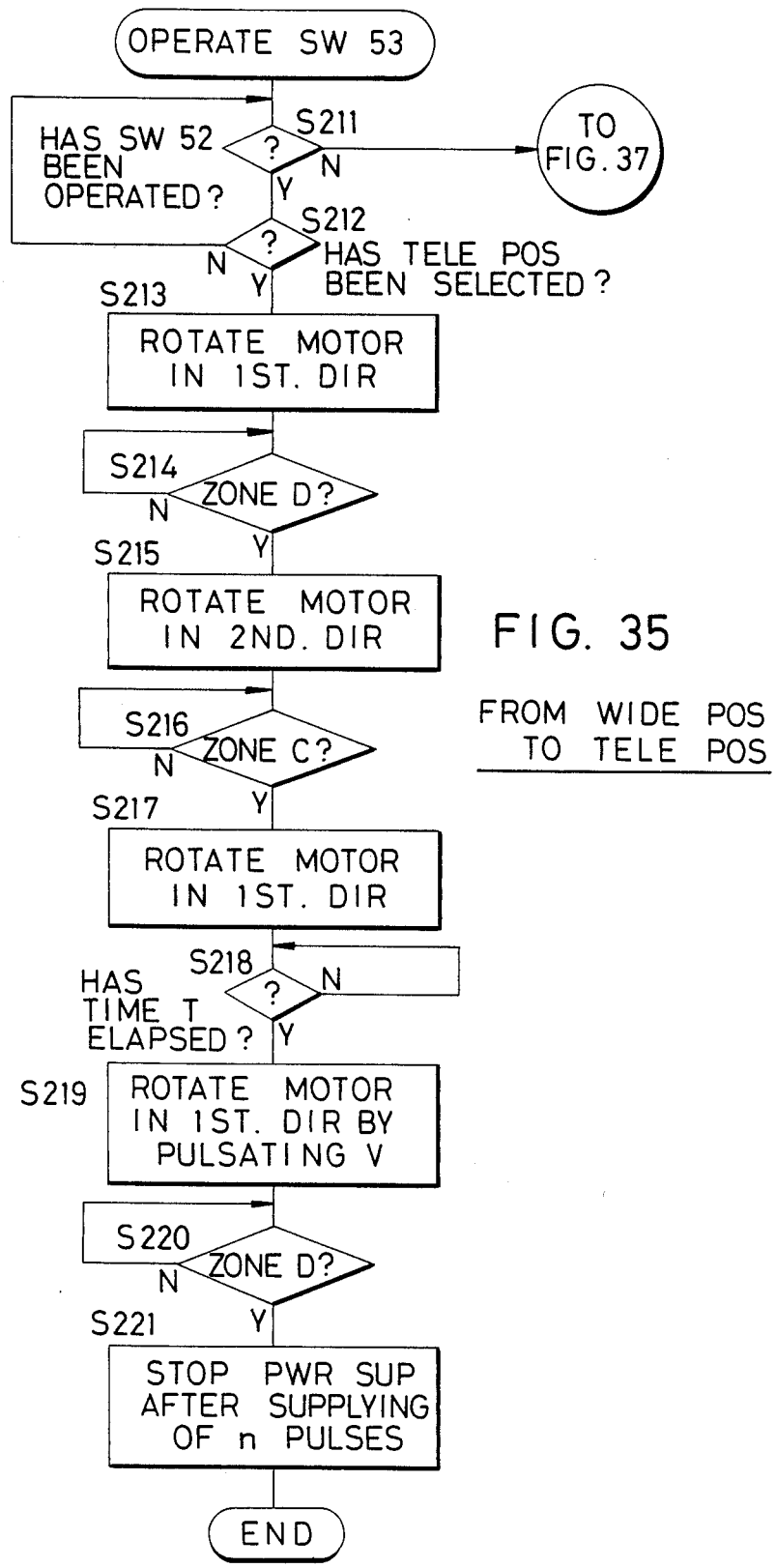

When the change-over switch 53 is operated to select the tele position, the program of FIG. 35 is executed and the lens barrel is axially moved from the wide position to the tele position. At step S211, whether the main switch 52 is closed is determined, and if the answer is affirmative, whether the tele position has been selected by the switch 53 is determined at step S212. If the tele position has been selected, the program proceeds to step S213, where the motor is rotated in the forward direction, and the motor continues the rotation in the forward direction until the zone D is detected at step S214, and if the step S214 is affirmed, the motor is reversed in its direction of rotation at step S215. The motor continues the rotation in the reverse direction until the zone C is detected at step S216, and if the step S216 is affirmed, the motor is again rotated in the forward direction at step S217. At step S218, the forward rotation of the motor by full power supply is continued for a predetermined time, whereafter at step S219, power is pulse-supplied to the motor. When at step S220, the zone D is detected, power is further supplied to the motor by n pulses, whereafter the power supply to the motor is stopped. By the above-described processing, the lens barrel is set at the tele position.

Figure 36:
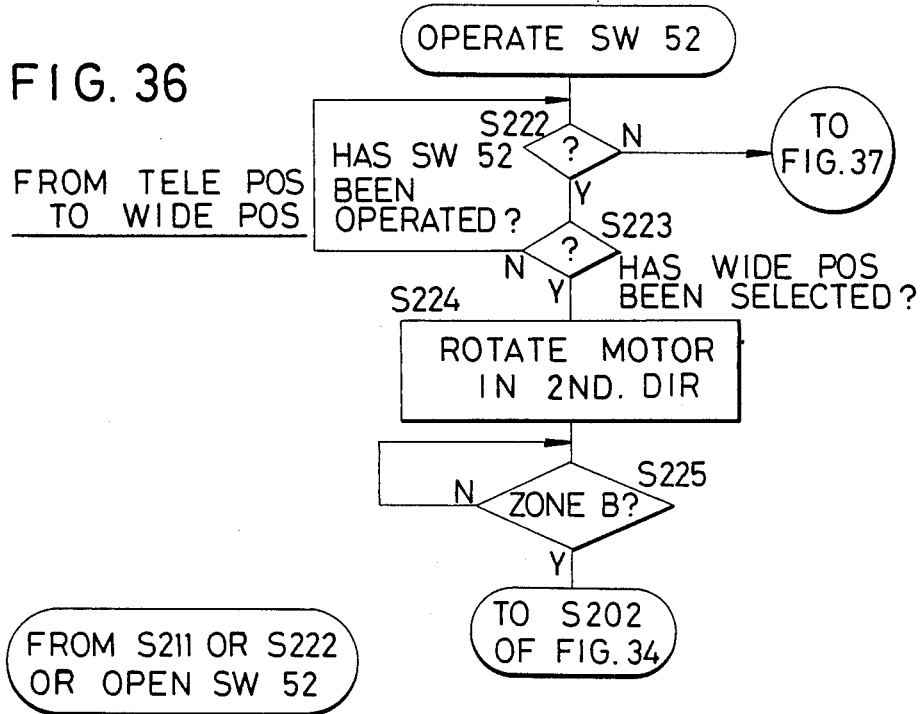

When the change-over switch 53 is operated to select the wide position, the program of FIG. 36 is executed and the lens barrel is axially moved from the tele position to the wide position. At step S222, whether the main switch 52 is closed is determined, and if the answer is affirmative, whether the wide position has been selected by the switch 53 is determined at step S223. If the wide position has been selected, the program proceeds to step S224, where the motor is rotated in the reverse direction, and the motor continues the rotation in the reverse direction until the zone B is detected at step S225. If the step S225 is affirmed, the program proceeds to the step S202 of FIG. 34, whereafter the procedure up to step S210 is executed.

The then movement of the lens barrel, the signals from the X and Y terminals 33 and 34 of the encoder and the voltage across the motor will now be described with reference to FIG. 39.

By the reverse rotation of the motor to which a negative voltage has been applied (step S224), the lens barrel is axially moved from the tele position toward the wide position. When at time $t_{11}$, the encoder detects the zone B (step S225), a positive voltage is applied to the motor (step S202) and reverse power supply brake is applied, but the lens barrel is still moved in the same direction by its inertia and is axially moved from a certain time. When at time $t_{12}$, the encoder detects the zone C, a negative voltage is applied to the motor (step S204) and reverse power supply brake is applied, but the lens barrel is still moved in the same direction by its inertia, and is axially moved from a certain time. When at time $t_{13}$, the encoder again detects the zone B, a positive voltage is applied to the motor for a predetermined time T (steps S206 and S207) and reverse power supply brake is applied. At this time, the lens barrel is axially moved by its inertia till a certain time. After the lapse of said predetermined time, a positive voltage is pulse-supplied to the motor to rotate the motor in the forward direction at a low speed. The lens barrel is axially moved at a low speed as compared with that during the full power supply till time $t_{13}$. When at time $t_{14}$, the encoder detects the zone C, power is further supplied to the motor by n pulses, whereafter the power supply to the motor is stopped and the lens barrel is stopped at the wide position (step S210).

Figure 37:
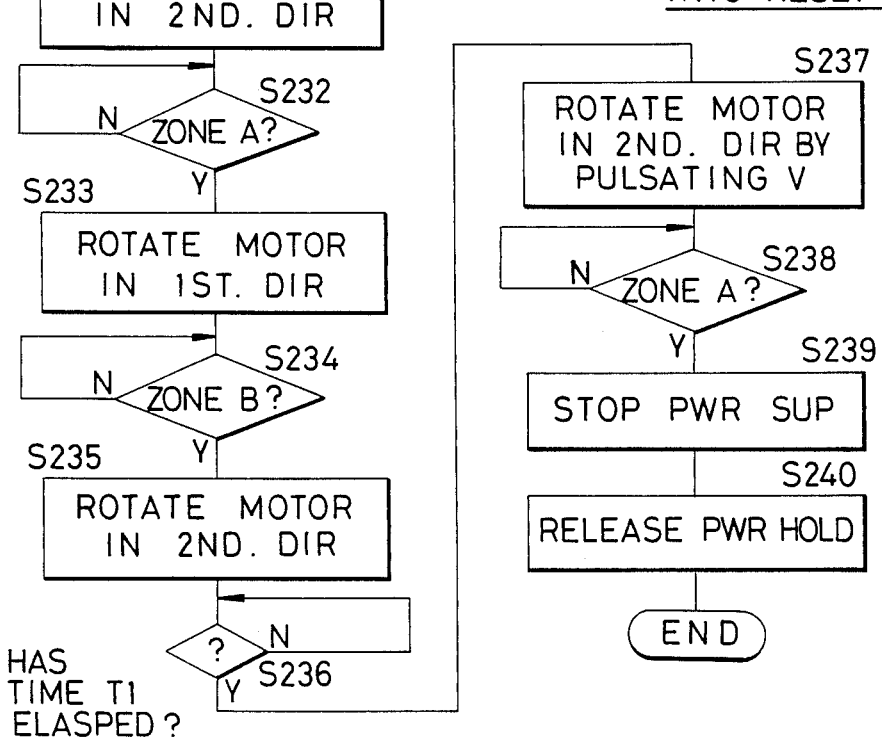

If at the steps S211 and S222, it is judged that the main switch 52 is opened, the program of FIG. 37 is executed and the lens barrel is moved to the reset position. That is, at step S231, the motor is rotated in the reverse direction and at step S232, the zone A is detected, whereupon the program proceeds to step S233, where the motor is rotated in the forward direction. When at step S234, the zone B is detected, the motor is rotated in the reverse direction at step S235, and at step S236, after the lapse of a predetermined time T1, pulse power supply is effected to the motor, and when at step S238, the zone A is detected, the power supply to the motor is cut off at step S239 to stop the motor. Finally, at step S240, the hold of the power source is released. The counted time T1 of step S236 is set to a value greater than the time T of said steps S207 and S218. This is for the purpose of closing also a protective cover covering the front face of the lens by the force of the lens driving motor during the movement to the reset position.

Steps S206, S207, S217, S218, S235 and S236 may be omitted, but in this case, the reverse power supply brake does not work and therefore, the time until the low speed control is entered becomes a little longer.

According to the control procedure of the present embodiment, design is made such that when the lens barrel is to be moved to a designated position, pulse power supply is effected after the lens barrel has crossed the target position several times. The amount of overrun by which the lens barrel overruns in the opposite direction after the target position is detected is greater as the power source voltage is higher, but the movement speed of the lens barrel at which the lens barrel goes from the overrun position back to the target position is also higher as the power source voltage is higher and therefore, after all, the time required for the overrun and the time required for the lens barrel to return from the overrun position to the target position do not depend on the power source voltage. Accordingly, the set time to the target position does not depend on the power source voltage and therefore, even if the power source voltage drops, the lens barrel can be quickly set at the wide position or the tele position.

Figure 38:
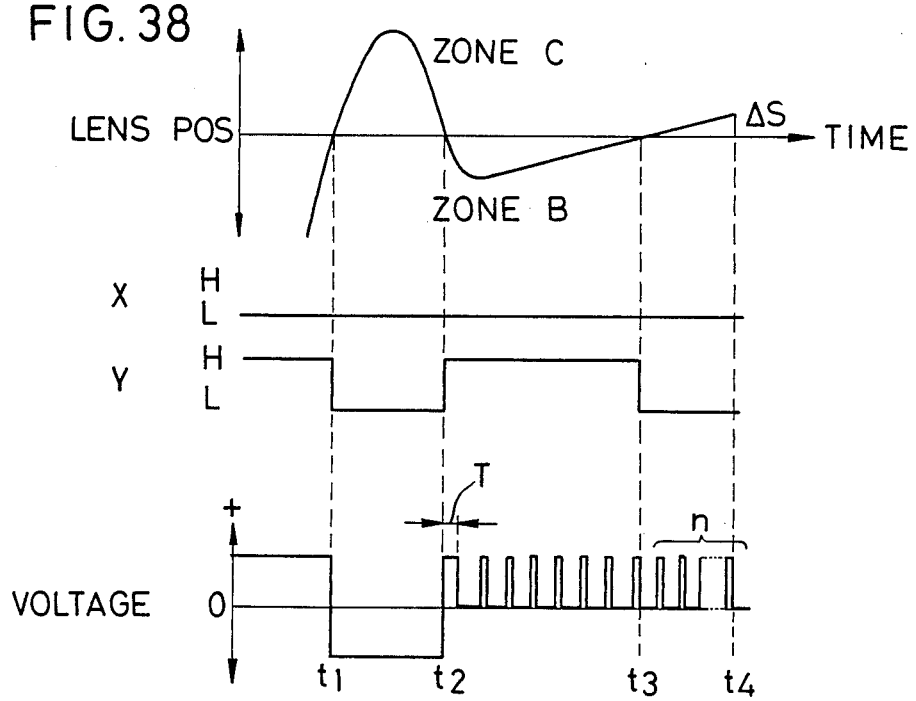
FIGS. 38 and 39 are graphs showing the movement characteristic of the lens.
Figure 39:
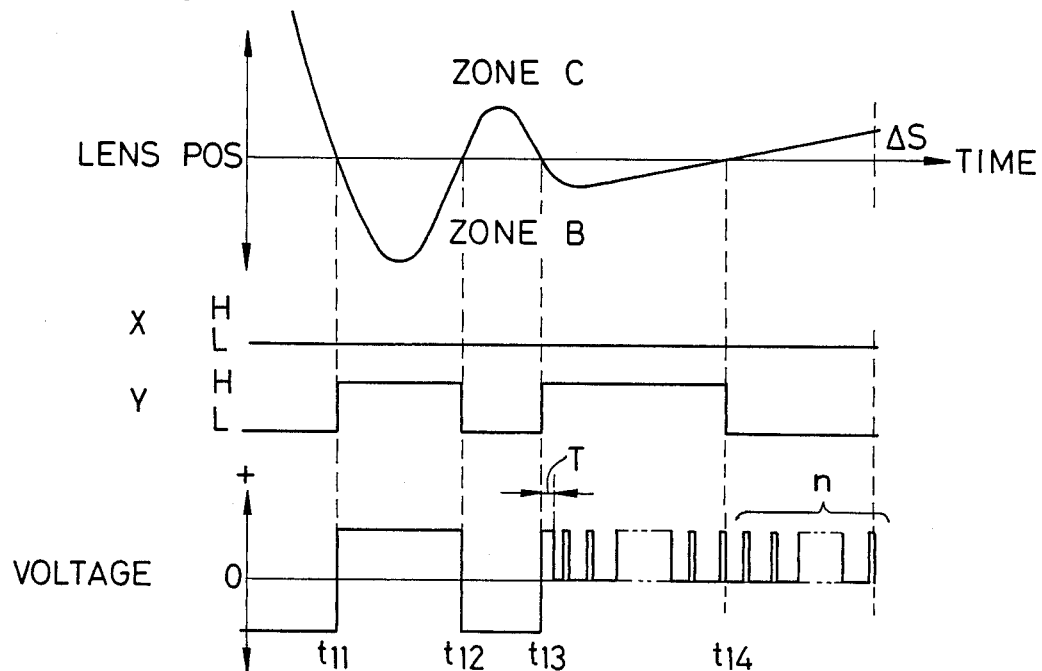

As shown in FIG. 38, during the movement from the reset position to the wide position, the motor low speed control by the pulse power supply is entered after the lens barrel has crossed the wide position twice, and as shown in FIG. 39, during the movement from the tele position to the wide position, the motor low speed control by the pulse power supply is entered after the lens barrel has crossed the wide position three times. That is, in the present embodiment, in any of the movement from the reset position to the wide position and the movement from the tele position to the wide position, the lens barrel is designed to be stopped upon completion of the movement thereof in the direction of axial movement and therefore, the positional deviation resulting from the back-lash or the like as described in connection with the first embodiment is eliminated and the positional accuracy is improved.

After the lens barrel has been stopped at the target position in accordance with the program of the present embodiment, a pulse voltage for rotating the motor in the direction opposite to the direction of rotation of the motor immediately before its stoppage by a minute amount, i.e., by an amount necessary to eliminate the resilient deformation created in the interior of the gear train 6 while the drive lens 2 is kept stationary is supplied to the motor, whereby position control which is free of the positional deviation by back-lash and the positional deviation attributable to the resilient deformation of the gear shown in FIGS. 24-27 becomes possible.

In the present embodiment, it is preferable that the duty of the pulse voltage supplied to the motor when the motor is pulse-driven be determined such that the movement of the lens barrel caused by a voltage of one pulse is terminated before the next pulse voltage is supplied. The reason therefor is as follows.

Figure 40:
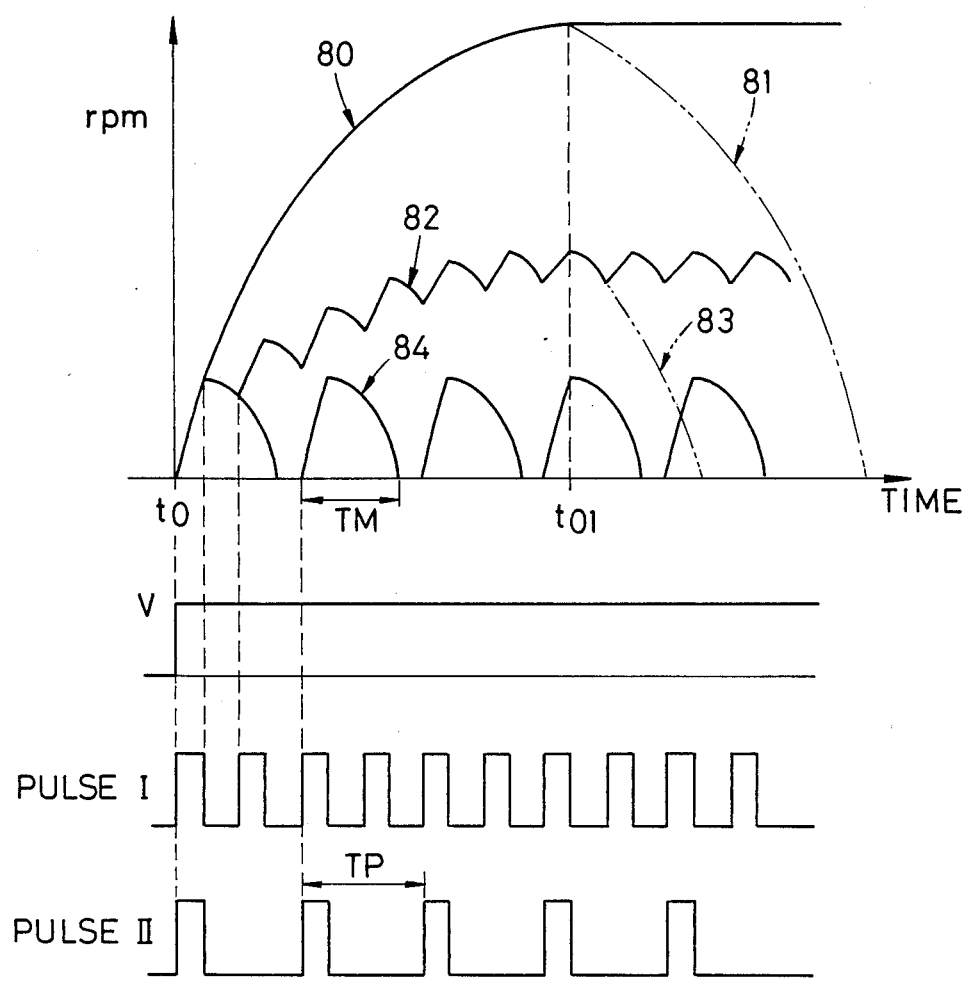
FIG. 40 is a graph showing a voltage and a variation in the number of revolutions of the motor.

FIG. 40 shows the variations in the number of rotations of the motor shaft when a DC voltage is supplied to the motor and when a pulse voltage is supplied to the motor. When at time $t_0$, a DC voltage V is supplied, the number of rotations varies along curve 80, and when at time $t_{01}$, the power supply is cut off, the number of rotations varies along curve 81 indicated by dots-and-dash line. On the other hand, when at time $t_0$, a pulse voltage I is supplied, the number of rotations varies along curve 82, and when at time $t_{01}$, the power supply is cut off, the number of rotations varies along curve 83 indicated by dots-and-dash line. One period of this pulse voltage I is shorter than the time necessary for the motor to be stopped and therefore, the number of rotations of the motor generally increases while varying at each pulse period. Accordingly, a sufficient speed reducing effect cannot be expected and therefore, after all, the gear ratio of the drive transmitting system must be made great and the amount of movement of the lens barrel per pulse must be made small. This leads to the problem that the movement speed of the lens by a DC voltage becomes low.

There is also a disadvantage that the positioning accuracy of the lens depends on the fluctuation of the power source voltage.

In contrast, a pulse voltage- II has a period TP longer than that of the pulse voltage I. When the pulse voltage II is supplied to the motor, the motor repeats acceleration, deceleration and stoppage along curve 84 at each pulse. That is, the period TP of the pulse voltage II is set longer than the period TM of the variation in the motor driven at that duty. As a result, the drawback of the pulse voltage I is eliminated and the responsiveness during the stoppage of the motor is very much improved.

Figure 41:
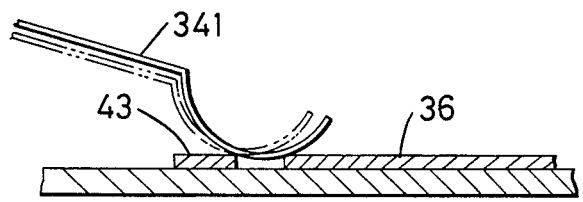
FIGS. 41 and 42 are enlarged views of the brush of the encoder.

Further, in the program of the present embodiment, each of steps S210 and S221 is provided to ensure the contact between each terminal of the encoder and the electrically conductive pattern. For example, when the zone C has been detected by step S209, namely, at the point of time t3 of FIG. 38, the brush 341 constituting the terminal 34 of the encoder is in the position as shown in FIG. 41 relative to the electrically conductive pattern 36. In this case, the state of contact is unstable and therefore, there is the possibility that by the influence of vibration or the like, the brush 341 may be moved as indicated by phatom line and the position signal may be varied. This also holds true when the zone D has been detected by step S220.

Figure 42:
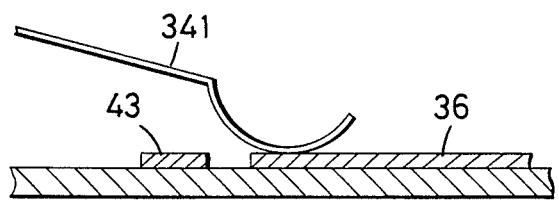

Therefore, at step S210, from the position at which the zone C has been detected, power is further supplied to the motor by n pulses to move the brush 341 to the position shown in FIG. 42, and this position is defined as the target position corresponding to the wide position of the lens. Accordingly, in the target position, the brush rides completely on the electrically conductive pattern and therefore, even if vibration or the like acts on the camera, the state of contact will not be varied. A similar effect is also obtained with respect to step S221.

The present invention is also applicable to a position control device for driving a photo-taking optical system for auto-focus to the in-focus position. In such case, command means corresponds to a focus detecting circuit, and the position command depends on the amount and direction of defocus.

Description will now be made of another embodiment of the key and the key way shown in FIG. 1.

Figure 43:
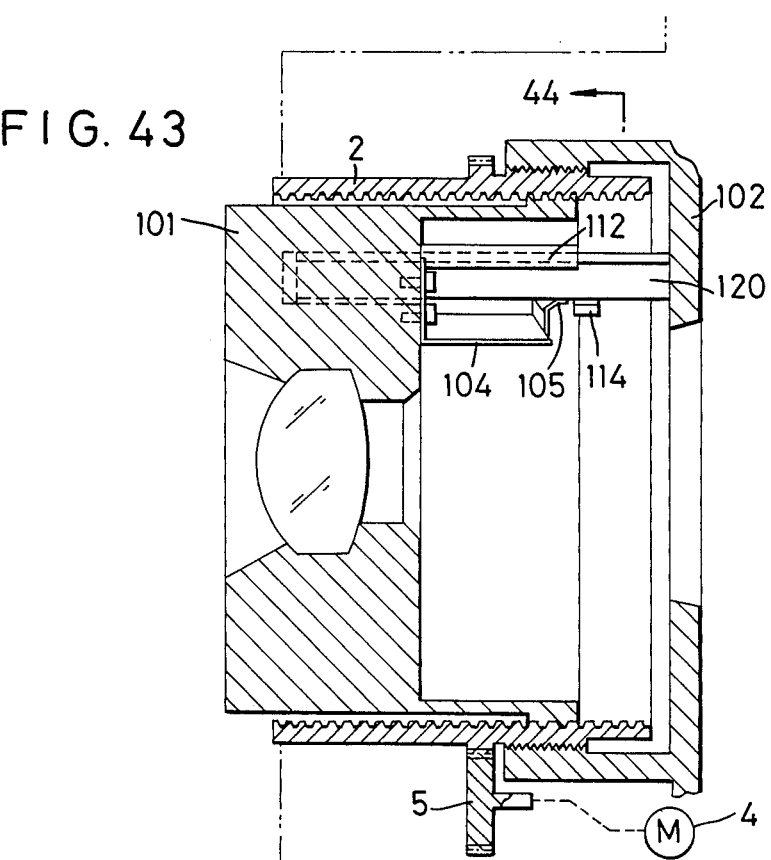
FIG. 43 is a cross-sectional view of a camera according to another embodiment of the present invention.
Figure 44:
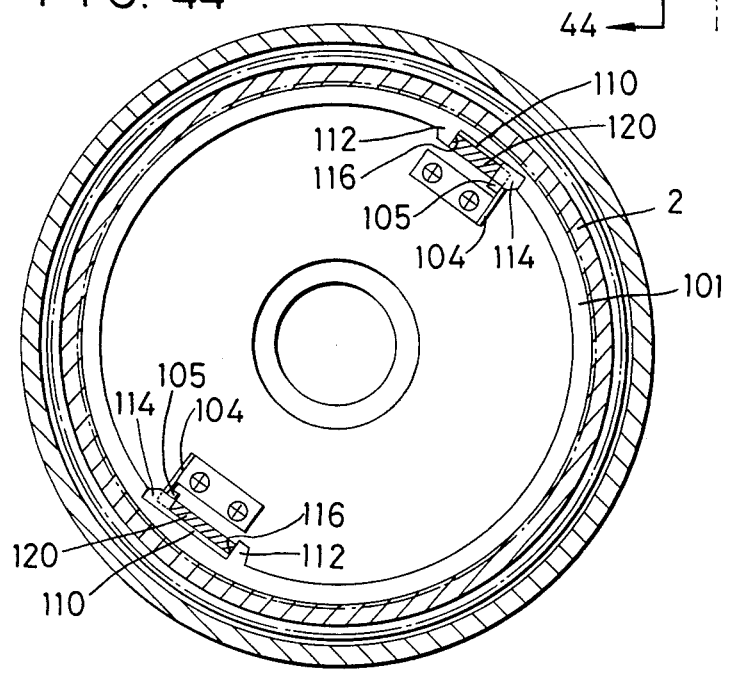
FIG. 44 is a cross-sectional view taken in the direction of arrows in FIG. 43.

Referring to FIG. 43, two key ways 110 interposed between two projections 112 and 114 radially projected as shown in FIG. 44 are formed in the inner periphery of an outer cylinder 101 holding the primary optical system.

Each key 120 engaged with the respective key way extends long in the direction of the optic aixs and is secured to the fixed portion 102 of the camera body. Leaf springs 104 are secured to the bottom surface of the outer cylinder 101, and the free end 105 of each of the leaf springs 104 is in contact with one side of the key 120 and presses the same. Each projection 112 is formed long in the direction of the optic axis on the inner surface of the cylindrical portion of the outer cylinder 101, and each projection 114 is projectedly formed on the end of the cylindrical portion. Two sets of such keys, key ways and leaf springs each are provided at locations substantially symmetrical with respect to the optic axis.

When the drive gear 5 is rotated by the motor 4, the outer cylinder 101 is moved in the direction of the optic axis in accordance with the pitch of the helicoid as in the embodiment of FIG. 1. In the meantime, the free end 105 of each leaf spring 104 is in pressure contact with one end surface of each key 120 and therefore, the key 120 always bears against one groove wall 116 of each key way 110, and this groove wall 116 slides relative to the other end surface of the key. Accordingly, there occurs no back-lash in the engagement between the key and the key way.

Further, since the friction forces provided by the biasing forces of the leaf springs act between the keys and the key way walls, the outer cylinder 101 and the fixed portion 102 are coupled integrally to each other, and with the aid of the frictional coupling thereof, the position thereof will not be changed by their gravities or a force such as some degree of vibration. Accordingly, the lens positioned by the rotation of the drive barrel 2 will not have its position disturbed unless the drive barrel 2 is rotated again.

The key coupling mechanism of the present embodiment may be one set. However, by arranging plural sets of such mechanisms symmetrically with respect to the optic axis, the inclination of the outer cylinder can be prevented. Also, the leaf springs 104 may be replaced, for example, by elastic members of synthetic rubber or like material having a wear resisting property.

We claim:

1. A camera including:
    a photo-taking optical system;
    command means for commanding the position of said photo-taking optical system;
    drive means for driving said photo-taking optical system in the direction of the optic axis;
    position detecting means for detecting the position of said photo-taking optical system on the optic axis; and
    drive control means for drivingly controlling said drive means on the basis of the position command from said command means and the detection result from said position detecting means and setting said phototaking optical system from the current position to a commanded position;
    said drive control means controlling said drive means to reciprocally drive said photo-taking optical system alternately in first and second directions of movement and then driving said drive means at a low speed to move said photo-taking optical system in said first direction of movement and stopping said photo-taking optical system at said commanded position each time said commanded position is detected by said position detecting means, until said commanded position is detected n times when said commanded position is in the first direction of movement from said current position, and until said commanded position is detected n+1 times when said commanded position is in the second direction of movement opposite to said first direction of movement from said current position.

2. A camera according to claim 1, wherein the low speed control of said drive means is effected by a pulse power supply to said drive means, and said pulse power supply is effected after full power supply has been effected for a predetermined time so that in response to said commanded position being detected n times or n+1 times, said photo-taking optical system is moved in the first direction of movement.

3. A camera including:
    a photo-taking optical system;
    command means for commanding the position of said photo-taking optical system;
    drive means for driving said photo-taking optical system in the direction of the optic axis through a power transmitting system;
    position detecting means for detecting the position of said photo-taking optical system on the optic axis; and
    drive control means for drivingly controlling said drive means on the basis of the position command from said command means and the detection result from said position detecting means and setting said photo-taking optical system from the current position to a commanded position;
    said drive control means reversely supplying power to said drive means to reversely rotate said power transmitting system by an amount corresponding to the resilient deformation of said power transmitting system after having set said photo-taking optical system at said commanded position.

4. A camera according to claim 3, wherein the reverse supply of power of said drive control means is effected by supply of pulse power to said drive means of a minimum number of pulses necessary to eliminate the resilient deformation of said power transmitting system.

5. A camera including:
    a photo-taking optical system;
    command means for commanding the position of said photo-taking optical system;
    drive means for driving said photo-taking optical system in the direction of the optic axis;
    position detecting means for detecting the position of said photo-taking optical system on the optic axis; and
    drive control means for drivingly controlling said drive means on the basis of the position command from said command means and the detection result from said position detecting means and setting said photo-taking optical system from the current position to a commanded position;
    said position detecting means detecting that said photo-taking optical system has been positioned at a predetermined position short of the commanded position commanded by said command means, said drive control means pulse-driving said drive means by n pulses to set said photo-taking optical system at said commanded position after said position detecting means has detected that said photo-taking optical system has been set at said predetermined position.

6. A camera including:
    a photo-taking optical system;
    a motor for driving said photo-taking optical system in the direction of the optic axis; and
    drive circuit means for alternatively supplying a DC drive signal and a pulse drive signal to said motor and driving said motor by said pulse drive signal near a predetermined stop position of said photo-taking optical system to bring said photo-taking optical system to said stop position;
    the duty of said pulse drive signal being determined so that said photo-taking optical system is stopped within one period of said pulse.

* * * * *